United States Patent [19]
Okamoto et al.

[11] Patent Number: 5,944,794
[45] Date of Patent: Aug. 31, 1999

[54] USER IDENTIFICATION DATA MANAGEMENT SCHEME FOR NETWORKING COMPUTER SYSTEMS USING WIDE AREA NETWORK

[75] Inventors: Toshio Okamoto; Atsushi Shimbo; Masahiro Ishiyama, all of Tokyo, Japan

[73] Assignee: Kabushiki Kaisha Toshiba, Kawasaki, Japan

[21] Appl. No.: 08/537,594

[22] Filed: Oct. 2, 1995

[30] Foreign Application Priority Data

Sep. 30, 1994 [JP] Japan .................................. 6-261277

[51] Int. Cl.⁶ .................................................. G06F 13/00
[52] U.S. Cl. .......................... 709/225; 709/219; 380/30; 713/201
[58] Field of Search ....................... 395/187.01, 188.01, 395/186, 200.06, 200.55, 200.57, 200.47, 200.49; 380/23, 24, 25, 49, 30; 340/825.34; 364/286.4, 286.6; 709/225, 227, 217, 219; 713/201

[56] References Cited

U.S. PATENT DOCUMENTS

| | | | |
|---|---|---|---|
| 4,405,829 | 9/1983 | Rivest et al. | 380/49 |
| 5,204,961 | 4/1993 | Barlow | 380/25 |
| 5,239,648 | 8/1993 | Nukui | 380/25 |
| 5,274,824 | 12/1993 | Howarth | 364/286.4 |
| 5,418,854 | 5/1995 | Kaufman et al. | 380/23 |
| 5,440,635 | 8/1995 | Bellovin et al. | 380/25 |
| 5,455,953 | 10/1995 | Russell | 395/187.01 |
| 5,495,533 | 2/1996 | Linehan et al. | 380/21 |
| 5,502,766 | 3/1996 | Boebert et al. | 380/25 |
| 5,590,199 | 12/1996 | Krajewski, Jr. et al. | 380/25 |
| 5,757,920 | 5/1998 | Misra et al. | 380/25 |

OTHER PUBLICATIONS

Laferriere et al., Authentication and Authorization Techniques in Distributed Systems, Oct. 1993, pp. 164–169.
Harn et al., Password Authentication Based on Public–Key Distribution Cryptosystem, Feb. 1989, pp. 332–338.
Okamoto et al., Identity Based Information Security Management System for Personal Computer Networks, Feb. 1989, pp. 290–294.
Lu et al., A Model for Multilevel Security in Computer Networks, Mar. 1988, pp. 1095–1104.
Ioannidis et al., "The Architecture and Implementation of Network–Layer Security Under Unix", pp. 29–39, (1993).

*Primary Examiner*—Zarni Maung
*Assistant Examiner*—Patrice L. Winder
*Attorney, Agent, or Firm*—Foley & Lardner

[57] ABSTRACT

A user identification data management scheme for a networking computer systems formed by a plurality of computers which are mutually connected through a network. In this scheme, at each computer, whether an access request from a user at another computer to each computer is to be permitted or not is judged, and access permission data necessary in checking whether a communication to each computer is from one user at one computer from which an access to each computer by that one user is permitted is generated. The generated access permission data are then stored in a memory. Then, whether an access to each computer is directly made at each computer or indirectly made from another computer through the network is detected, whether that access is proper or not is judged in a case that access is indirectly made, and that access is permitted in a case that access is judged as proper, according to the access permission data stored in the memory.

45 Claims, 25 Drawing Sheets

FIG.12

| USER ID | NETWORK ADDRESS OF PERMITTED EXTERNAL SYSTEM | VALID PERIOD | OTHER CONDITIONS |
|---|---|---|---|
| 1 | B | UNTIL 1995.12.31 | |
| 2 | A~D | 1995.1.1~1995.12.31 | |
| 3 | ALL | ANY TIME | |
| 4 | C | 1995.9.1 9:00~17:00 | TELNET,FTP ONLY |
| 5 | NONE | NONE | |
| . | . | . | . |

FIG.13

| USER ID AT THIS SYSTEM | NETWORK ADDRESS OF PERMITTED EXTERNAL SYSTEM | USER ID AT PERMITTED EXTERNAL SYSTEM | SESSION KEY | SESSION ID | VALID PERIOD | OTHER CONDITIONS |
|---|---|---|---|---|---|---|
| 1 | B | 101 | ABCDEF | 1 | UNTIL 1995.12.31 | |
| 3 | F | 43 | QWERTY | 2 | ANY TIME | |
| 4 | C | 67 | ZXCVBN | 3 | 1995.9.1 9:00~17:00 | TELNET,FTP ONLY |
| | | | . . . | | . . . | |

FIG.17

| USER ID | NETWORK ADDRESS OF EXTERNAL SYSTEM | TEMPORARY PASSWORD | VALID PERIOD |
|---|---|---|---|
| 1 | B | ABC123 | 1994.4.1 13:00~17:00 |
| | | . . . . | |

FIG.19

| USER ID AT THIS SYSTEM | NETWORK ADDRESS OF EXTERNAL SYSTEM | USER ID AT EXTERNAL SYSTEM | VALID PERIOD |
|---|---|---|---|
| 1 | B | 101 | 1994.4.1 13:00~17:00 |

FIG.23

| NETWORK ADDRESS | SYSTEM NAME | LOCATION |
|---|---|---|
| 1000 | HEAD OFFICE | MINATO-KU, TOKYO |
| 1001 | KAWASAKI BRANCH | KAWASAKI-KU, KAWASAKI |
| 1002 | RESEARCH CENTER | MIYUKI-KU, KAWASAKI |
| 1003 | OSAKA BRANCH | KITA-KU, OSAKA |
| ⋮ | ⋮ | ⋮ |
| 2000 | CONFERENCE ROOM A | HEAD OFFICE 9F |
| 2001 | CONFERENCE ROOM B | HEAD OFFICE 8F |
| 2002 | CONFERENCE ROOM C | HEAD OFFICE 7F |
| ⋮ | ⋮ | ⋮ |

USER IDENTIFICATION DATA MANAGEMENT SCHEME FOR NETWORKING COMPUTER SYSTEMS USING WIDE AREA NETWORK

BACKGROUND OF THE INVENTION

1. Field of the Invention

The present invention relates to a user identification data management scheme in networking computer systems in which a plurality of computer systems are connected through a wide area network, where each computer system is managed independently to limit accesses from an external location under a different management.

2. Description of the Background Art

In conjunction with a down sizing of a computer system and an enrichment of a network environment, the use of a computer system has rapidly expanded into a wide range of fields, and there has been a trend for shifting from a centralized system to a distributed system. For example, terminals or workstations (WS) are installed in an office and utilized for business purposes such as document or spread sheet productions, or for technical calculations such as simulations, or as CAD for a variety of designing purposes, or as a communication system providing electronic mail services.

In addition to the advance in the computer system itself, with the progress and the spread of the computer network technology, it has becomes increasingly popular nowadays to share resources such as files and printers in an office, to utilize services provided outside an office, and to communicate with outside of an office.

For instance, a super-computer is installed in an external computer center for the purpose of scientific calculations requiring specialized or high speed processing, and shared by many users. Each user connects his own WS to this super-computer by means of a remote log-in function, transfers data by means of a remote file copy function, requests the super-computer to execute the necessary processing, and receives the processing result on his own WS for storing into a recording medium or displaying at a display.

Also, by utilizing such a computer network environment, a WS conference can be held by connecting his or her own WS with other WSs at remote locations, or opinions can be exchanged by means of electronic mail.

The utilization mode of a computer system such as the WS conference or the electronic mail is particularly effective when all the information and processing necessary for the communication are provided on the user's own computer system.

Moreover, there are progresses in the graphics technology, the file capacity, and the multi-media technology. However, the functions of the computer system or the network are still insufficient to match progresses in these fields. For instance, the WS conference system can be effectively utilized for the purpose of transmitting data contents, but its ability to convey information is still insufficient to convey subtle reactions of participants such as facial expressions, or to convey impressiveness on the data transmitting side. Also, in a relatively large scale meeting as in a TV conference system, with the current communication capability and the display capability of the WS, each participant can be displayed only very small, at low resolution, such that there arises problems of a poor color reproduction and an awkward movement indication on a screen.

For this reason, in a conventional scheme (so called face-to-face scheme) in which participants are gathered at a prescribed conference room to have discussions, computer systems provided at the conference room are often utilized as providing assistance for the participants. In this case, the computer systems provided at the conference room are normally connected with the computer systems usually utilized by the participants (home systems) through a wide area network.

Here, however, the computer systems provided at the conference room are normally utilized consecutively in a variety of mutually unrelated conferences, so that there are cases in which an account to be registered such as a user name, a user ID, a password, etc. is set to be a temporary one valid only for each conference. In this case, the participant cannot utilize that computer system before the conference starts or after the conference is over. In addition, in this case, when it is possible for the participant to utilize his home system by remote access from the computer system at the conference room, the user authentication cannot be carried out by the computer system at the conference room, so that it is too risky to allow the remote accesses to the home system freely.

On the other hand, it is also possible to consider a scheme in which a predetermined common account is assigned to each computer system at the conference room in advance such that any participant of the conference can utilize the computer system provided at the conference room. In this case, however, the same account is going to be assigned to participants of different conferences in overlap, so that while the access before or after the conference becomes possible, it also becomes possible for the participant to look into files belonging to someone else who is utilizing the same account, so that there is a problem from a viewpoint of secrecy of data. In addition, as a password of such an account, an easily remembered one is usually employed in view of its pubic and shared nature, and the use of such an easily remembered password can potentially be disadvantageous from a viewpoint of security.

Furthermore, even when a user attempts to utilize a computer system of his or her own organization from a computer system provided at a different organization, such an access is often prohibited in order to prohibit an improper external access and protect important internal data. Consequently, the user is faced with an inconvenience of not being able to utilize the computer system of his or her own organization freely from an external location.

Thus, when an identical user has user IDs in correspondence to a plurality of computers under different managements, and uses a plurality of computers which are connected through a network while the user moves from a location of one computer to a location of another computer, it has been quite tedious for the user to carry out a procedure to make an access from one computer through another computer, because the system management, especially the user ID management, has been carried out independently at each computer. Moreover, when this procedure is simplified, there arises a problem from a viewpoint of security.

Also, it is a customary rule to set computers under different managements in a state in which the access from the external location through the network is either prohibited or severely limited, so that the user who utilizes a plurality of computers is required to modify the access limitation on the network in order to enable the access to a desired computer every time this user has changed his or her location, and the procedure for this modification and the modification operation required for that purpose have been quite tedious.

SUMMARY OF THE INVENTION

It is therefore an object of the present invention to provide a user identification data management scheme for networking computer systems, for enabling the user to utilize a plurality of computers under mutually different managements which are providing different utilization environments and connected through a network, without being conscious of a difference in the utilization environments of different computers even when the user moves from one computer to another, while enabling mutual accesses between the computers through a network and securing secrecy of data.

In order to achive this object, in the present invention, the computer systems under different managements are geographically distributed over a network, and a computer system to be accessed by the user detects whether the user is operating this computer system directly or the user is making the remote access from the external system. In a case of the remote access, the external computer system which is directly operated by the user makes the remote access target computer system to convert the user management data at this external computer system into the user management data at the remote access target computer system, such that it becomes possible to remove a limitation of the remote access from the external computer system due to the difference of the user name or the user ID while preventing the security hole (i.e., the improper use by the others) at a time of the file transfer, the remote log-in, etc.

From the user's point of view, when the other machine is utilized, each computer system automatically absorbs the difference in the user IDs which are different from one computer system to another by carrying out the access control which recognizes that the user IDs are different but the user is the same. As a result, when the user uses a different computer system, the proper access control with respect to his or her own files is set up automatically and the own files existing in the remote machine are transferred automatically, so that the convenience in use of the networking computer systems can be improved considerably.

To this end, the present invention basically provides the following measures.

For an access request from the user to the computer, whether that user is directly operating that computer or not is detected.

The conditions for permitting access from the external location are managed by a correspondence between the user identification data (such as the user ID) at each computer issued to the same user and the system identification data (such as the system ID or the network address) of that computer, or by signature data of the user or the computer system that can be authenticated by using a secret key assigned to each computer system and each user and a public key corresponding to that secret key.

In response to the access request from the external computer, the access requesting source is determined from the system identification data and the user identification data for that external computer, and the authentication using the signature data of the computer system and the user, and whether or not to permit that access request is judged by the access permission conditions.

In a case the access request from the external computer is permitted, the data for identifying the permitted communication and the data necessary in converting the user ID are stored.

When there is an access from the external computer, this access is detected and the data are coverted according to the data containing conversion procedure.

When data for the operation under the user identification data on that external computer are transferred to this computer system, the operation under the user identification data on that external computer is treated as that under the user identification data on this computer system.

According to one aspect of the present invention there is provided a computer system, comprising: a plurality of computers mutually connected through communication means for enabling communications among said plurality of computers, wherein said plurality of computers include at least one computer having: management means for judging whether an access request to said at least one computer from a user at another computer is to be permitted or not, and generating access permission data necessary in checking whether a communication to said at least one computer is from one user at one computer from which an access to said at least one computer by said one user is permitted; and memory means for storing the access permission data generated by the management means.

According to another aspect of the present invention there is provided a computer system, comprising: a plurality of computer groups mutually connected through communication means for enabling communications among said plurality of computer groups, wherein said plurality of computer groups include at least one computer group having: a data management server for judging whether an access request to a computer of said at least one computer group from a user at a computer of another computer group is to be permitted or not, and generating access permission data necessary in checking whether a communication to a computer of said at least one computer group is from one user at a computer of one computer group from which an access to a computer of said at least one computer group by said one user is permitted; and a security gateway including: memory means for storing a key data in correspondence to the access permission data generated by the data management server; detection means for detecting whether an access to a computer of said at least one computer group is directly made at a computer of said at least one computer group or indirectly made from a computer of another computer group through the communication means, judging whether said access is proper or not according to the access permission data stored in the memory means in a case said access is indirectly made, and permitting said access in a case said access is judged as proper; and data modification means for modifying communication data of said access by using the key data when the detection means judges said access as proper according to the access permission data.

According to another aspect of the present invention there is provided a computer in a computer system formed by a plurality of computers mutually connected through communication means for enabling communications among said plurality of computers, said computer having: management means for judging whether an access request to said computer from a user at another computer is to be permitted or not, and generating access permission data necessary in checking whether a communication to said computer is from one user at one computer from which an access to said computer by said one user is permitted; and memory means for storing the access permission data generated by the management means.

According to another aspect of the present invention there is provided a computer system, comprising: a plurality of computers mutually connected through communication means for enabling communications among said plurality of computers, wherein said plurality of computers include at least one computer having: detection means for detecting whether an access to said at least one computer is directly made at said at least one computer or indirectly made from another computer through the communication means, judging whether said access is proper or not in a case said access is indirectly made, and permitting said access in a case said access is judged as proper; memory means for storing a set of an external user identification data of one user at one computer from which an access to said at least one computer by said one user is to be permitted, an external system identification data of said one computer, and an internal user identification data for said one user at said at least one computer, such that the detection means judges said access as proper when the memory means stores a set of the external user identification data and the external system identification data coinciding with a user identification data and a system identification data indicated by communication data of said access; and conversion means for converting a user identification data indicated by communication data of said access into the internal user identification data corresponding to the external user identification data which coincides with a user identification data indicated by communication data of said access, when the detection means judges said access as proper.

According to another aspect of the present invention there is provided a computer system, comprising: a plurality of computers mutually connected through communication means for enabling communications among said plurality of computers, wherein said plurality of computers include at least one computer having: storage means for storing access permission conditions indicating a set of an external user identification data of one user at one computer from which an access to said at least one computer by said one user is to be permitted, an external system identification data of said one computer, and an internal user identification data for said one user at said at least one computer; detection means for detecting whether an access to said at least one computer is directly made at said at least one computer or indirectly made from another computer through the communication means; management means for judging whether said access from a user at said another computer to said at least one computer is to be permitted or not in a case said access is indirectly made, and permitting said access in a case said access is judged to be permitted, the management means judges by authenticating a source system identification data of said another computer, obtaining a source user identification data encrypted by a secret key of said another computer, authenticating the source user identification data by decrypting the source user identification data by using a public key of said another computer, and checking the access permission conditions stored in the storage means for authenticated source user identification data and source system identification data; and conversion means for converting a user identification data indicated by communication data of said access into the internal user identification data corresponding to the external user identification data which coincides with a user identification data indicated by communication data of said access, when the detection means judges said access as proper.

According to another aspect of the present invention there is provided a method of managing a computer system formed by a plurality of computers which are mutually connected through communication means for enabling communications among said plurality of computers, the method comprising the steps of: judging whether an access request from a user at another computer to each computer is to be permitted or not; generating access permission data necessary in checking whether a communication to said each computer is from one user at one computer from which an access to said each computer by said one user is permitted; storing the access permission data in a memory; and detecting whether an access to said each computer is directly made at said each computer or indirectly made from another computer through the communication means, judging whether said access is proper or not in a case said access is indirectly made, and permitting said access in a case said access is judged as proper, according to the access permission data stored in the memory.

According to another aspect of the present invention there is provided a method of managing a computer system formed by a plurality of computers which are mutually connected through communication means for enabling communications among said plurality of computers, the method comprising the steps of: judging whether an access request from a user at another computer to each computer is to be permitted or not; generating access permission data necessary in checking whether a communication to said each computer is from one user at one computer from which an access to said each computer by said one user is permitted; and storing the access permission data in a memory.

Other features and advantages of the present invention will become apparent from the following description taken in conjunction with the accompanying drawings.

BRIEF DESCRIPTION OF THE DRAWINGS

FIG. 12 is a diagrammatic illustration of an access permission condition list used at the server side computer system of FIG. 11 in a session set up operation.

FIG. 13 is a diagrammatic illustration of a session data stored in a session data storage unit at the server side computer system of FIG. 11 in a session set up operation.

FIG. 17 is a diagrammatic illustration of an access permission condition list used in the computer system of FIG. 15.

FIG. 19 is a diagrammatic illustration of an access permission data stored in a user ID correspondence management table in the computer system of FIG. 15.

FIG. 23 is a diagrammatic illustration of a database of a network management system that can be utilized in the computer system of FIG. 21.

DETAILED DESCRIPTION OF THE PREFERRED EMBODIMENTS

Now, the first embodiment of a user identification data management scheme for networking computer systems according to the present invention will be described in detail. This first embodiment is a prototype embodiment of a user identification data management scheme in the present invention on which subsequent embodiments are based.

Figure 1:
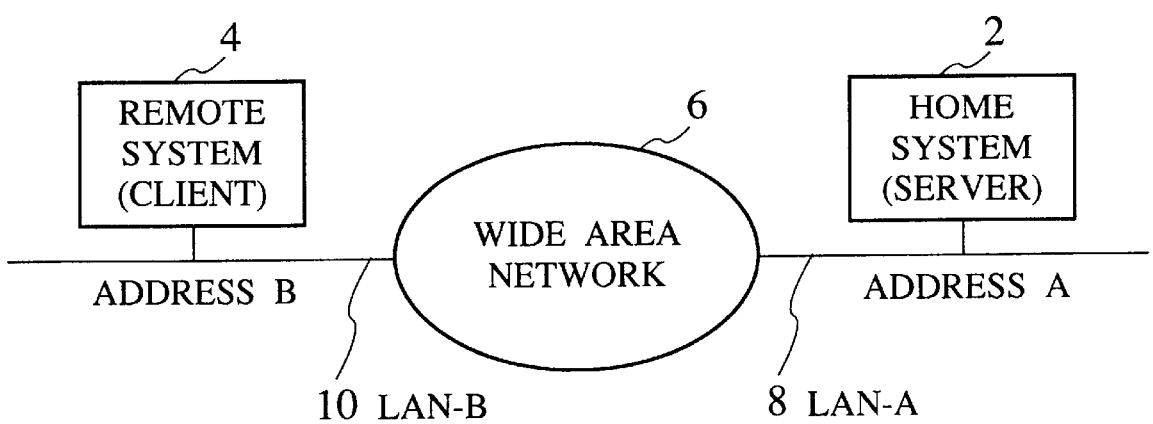
FIG. 1 is a schematic block diagram of an overall configuration of networking computer systems according to the present invention.

In this first embodiment, the networking computer systems have an overall configuration as shown in FIG. 1, which is a minimum configuration having two computer systems connected through a network. This system includes a computer system called home system (server) 2 which is usually utilized by a user, and a computer system called remote system (client) 4 which is located at a geographically distanced external location. This user is normally working on the home system 2, but in a case of conference, etc., this user goes out to the distanced location and works on the remote system 4.

The home system 2 and the remote system 4 are connected together by a wide area network 6 through LAN-A 8 and LAN-B 10 directly connected to the home system 2 and the remote system 4, respectively. The communication between the home system 2 and the remote system 4 is connected by a standard network protocol TCP/IP. Here, the home system 2 is connected with the wide area network 6 at a network address A, while the remote system 4 is connected with the wide area network 6 at a network address B.

In this configuration of FIG. 1, the standard network services can be utilized from either computer system. In this first embodiment, a case of using particular network services called a remote file transfer program (FTP) as defined by RFC 959 and a remote log-in program (TELNET) as defined by RFC 854 will be described. Each of these programs is formed by a client program to be activated by a user and a server program which is activated in advance and awaiting a service request from a client. These network services are well known ones, so that the further details of these network services that can be found elsewhere will be omitted here.

The home system 2 and the remote system 4 are belonging to different organizations, so that their managements are independent from each other, and consequently they are managed under different management schemes for user management (registration and/or deletion of user ID, etc.) and file management (setting of file access control for each file, limiting of file access for each user according to the access control setting, etc.). In other words, this configuration of FIG. 1 is a case in which the two computer systems of the home system 2 and the remote system 4 under mutually different managements are connected through the wide area network 6.

As for a type of a computer system, the home system 2 and the remote system 4 may be computer systems of the same type, or computer systems of different types. For example, when the home system 2 and the remote system 4 are both workstation systems, the home system 2 can be a main frame system while the remote system 4 is a workstation system.

In the following description of this first embodiment, both of these computer systems are assumed to be constructed on a UNIX system, although they may very well be constructed on any other operating system (OS) as long as the TCP/IP is supported and the services such as FTP and TELNET are provided.

Figure 2:
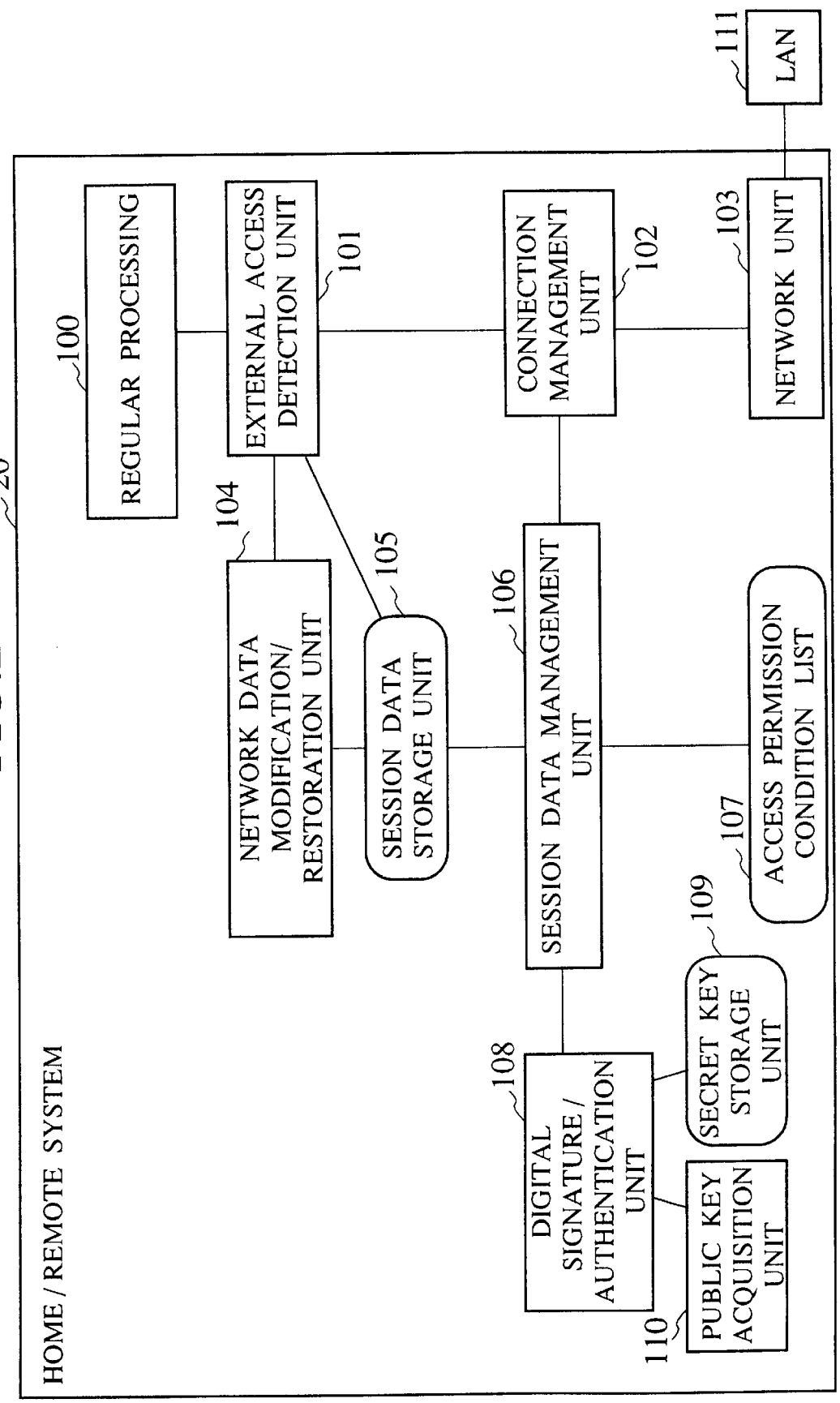
FIG. 2 is a block diagram of a functional configuration of each computer system (either a home system or a remote system) in the networking computer systems of FIG. 1 according to the first embodiment of the present invention.

In the configuration of FIG. 1, the home system 2 and the remote system 4 have the identical internal functional configuration 20 as shown in FIG. 2, which comprises: a regular processing 100, an external access detection unit 101 connected with the regular processing 100, a connection management unit 102 connected with the external access detection unit 101, a network unit 103 connected with the connection management unit 102 and a LAN 111, a network data modification/restoration unit 104 connected with the external access detection unit 101, a session data storage unit 105 connected with the external access detection unit 101 and the network data modification/restoration unit 104, a session data management unit 106 connected with the connection management unit 102 and the session data storage unit 105, an access permission condition list 107 connected with the session data management unit 106, a digital signature/authentication unit 108 connected with the session data management unit 106, a secret key storage unit 109 connected with the digital signature/authentication unit 108, and a public key acquisition unit 110 connected with the digital signature/authentication unit 108.

In this functional configuration 20 of FIG. 2, the regular processing 100, the connection management unit 102, the network unit 103, and the LAN 111 are substantially the same as the functions of the usual workstation on which UNIX is installed as the OS and related service programs, for example. Here, the regular processing 100 includes the user management.

More specifically, the regular processing 100 represents all the processings utilized by a user either directly or indirectly, and is equivalent to the functions provided in the usual workstation. Here, the specific functions provided by this regular processing 100 includes a log-in processing, a file system, a user management unit, an electronic mail, a document editor, a word processing function, a program development environment, a program execution environment, a window system, etc. In addition, as the functions utilizing the network, the regular processing 100 further includes a remote log-in, remote file transfer, etc.

The connection management unit 102 corresponds to a processing at a transport layer in the OSI 7 layer model, which carries out the processing of TCP or UDP in the TCP/IP. In other words, each computer system has identifiers called ports in correspondence to different protocols such as TCP and UDP, and this connection management unit 102 carries out the communication between computers in units of these ports.

The network unit 103 corresponds to a processing at a network layer in the OSI 7 layer model, which carries out the IP processing in the TCP/IP. This network unit 103 realizes the communication between computer systems by connecting a plurality of datalink layers through routers.

The other elements in the functional configuration 20 of FIG. 2 are new additional functions according to the present invention, which include the following.

The session data management unit 106 manages the access from the external location in a case of utilizing the home system 2 from the remote system 4 such that only the communication from the proper user at the external location can be allowed.

The session data storage unit 105 stores the data concerning a session for which the access from the external location has been permitted. A precise meaning of a session will be defined below. This data relates to the communication for which whether it is an access to/from the external location or not is detected at the external access detection unit 101, and this is the data which is necessary in checking whether this communication is a permitted one or not. This data will also be utilized by the network data modification/restoration unit 104.

The access permission condition list 107 stores various conditions under which the access from the external location to this system is possible, which will be utilized by the session data management unit 106.

The digital signature/authentication unit 108 authenticates the host ID or the user ID for the computer system which is making an access from the external location according to a digital cryptography technique. This digital signature/authentication 108 also attaches a signature to the host ID or the user ID for this computer system according to the digital cryptography technique.

The public key acquisition unit 110 searches and acquires the public key of the external machine or the user, which is necessary for the digital authentication.

The secret key storage unit 109 stores the secret key of this machine or the user on this machine, which is necessary for the digital signature.

The external access detection unit 101 detects the communication to/from the external location, and checks whether this communication is to/from the permitted external user or external computer system, according to the data stored in the session data storage unit 105.

The network data modification/restoration unit 104 encrypts or decrypts the communication data for safety at a time of communication with the external system. Also, this network data modification/restoration unit 104 attaches an identifier to the data in order to indicate that it is the permitted communication with the external location, or detaches this identifier from the data already checked by the external access detection unit 101.

Figure 3:
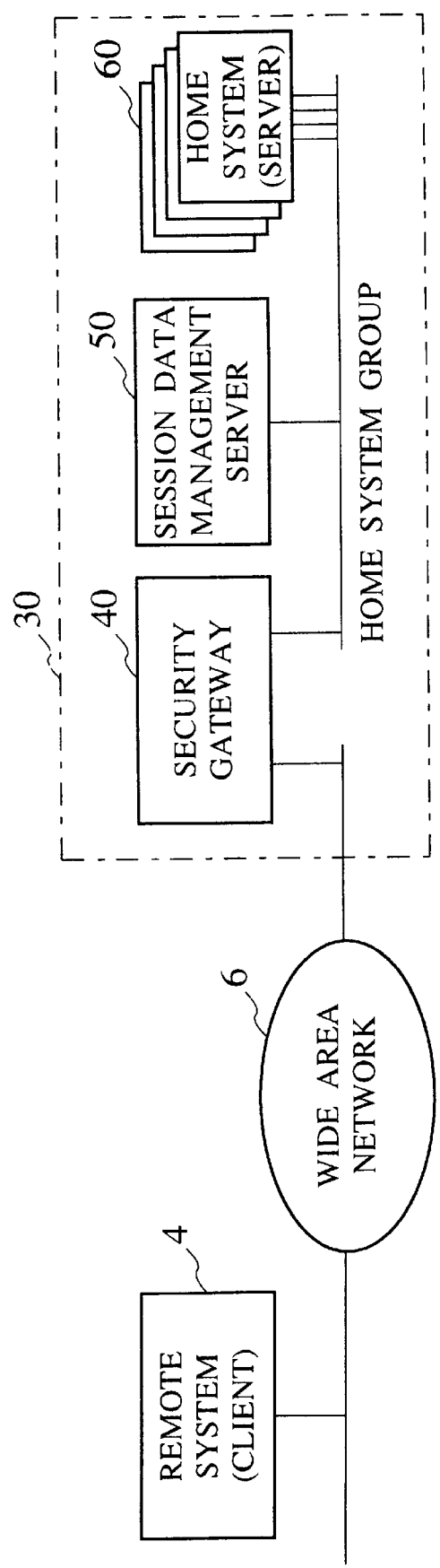
FIG. 3 is a schematic block diagram of an alternative overall configuration of networking computer systems according to the present invention.

FIG. 3 shows an alternative system configuration in which a plurality of home systems are placed under the same management, to form a single home system group. In this configuration of FIG. 3, the home system group 30 can be divided into a plurality of computers in correspondence to different functions, so that the home system group 30 comprises a security gateway 40 located at a junction with the external network, a session data management server 50 for carrying out the session data management, and a plurality of home systems 60 for executing desired processings.

Figure 4:
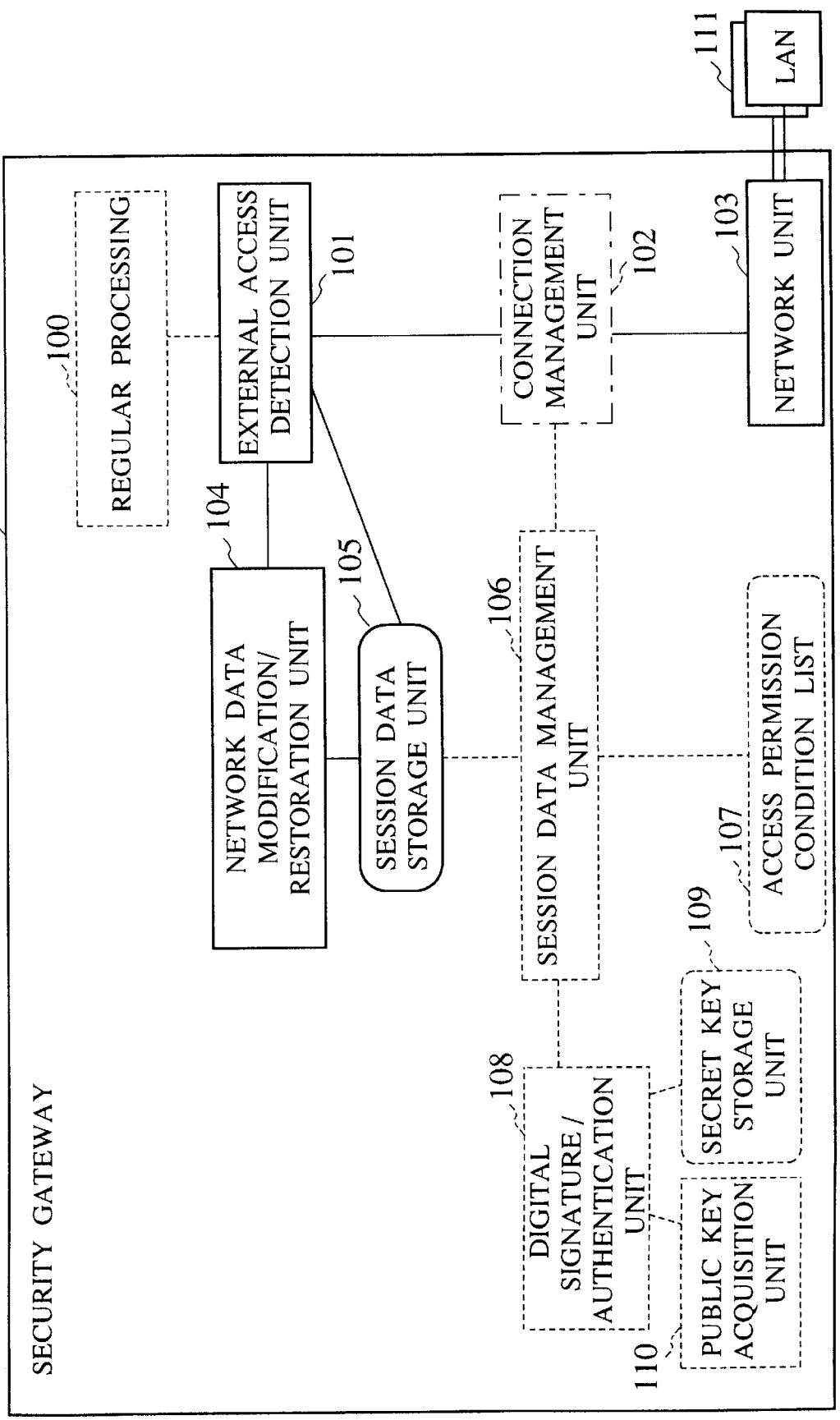
FIG. 4 is a block diagram of a functional configuration of a security gateway in the networking computer systems of FIG. 3.
Figure 5:
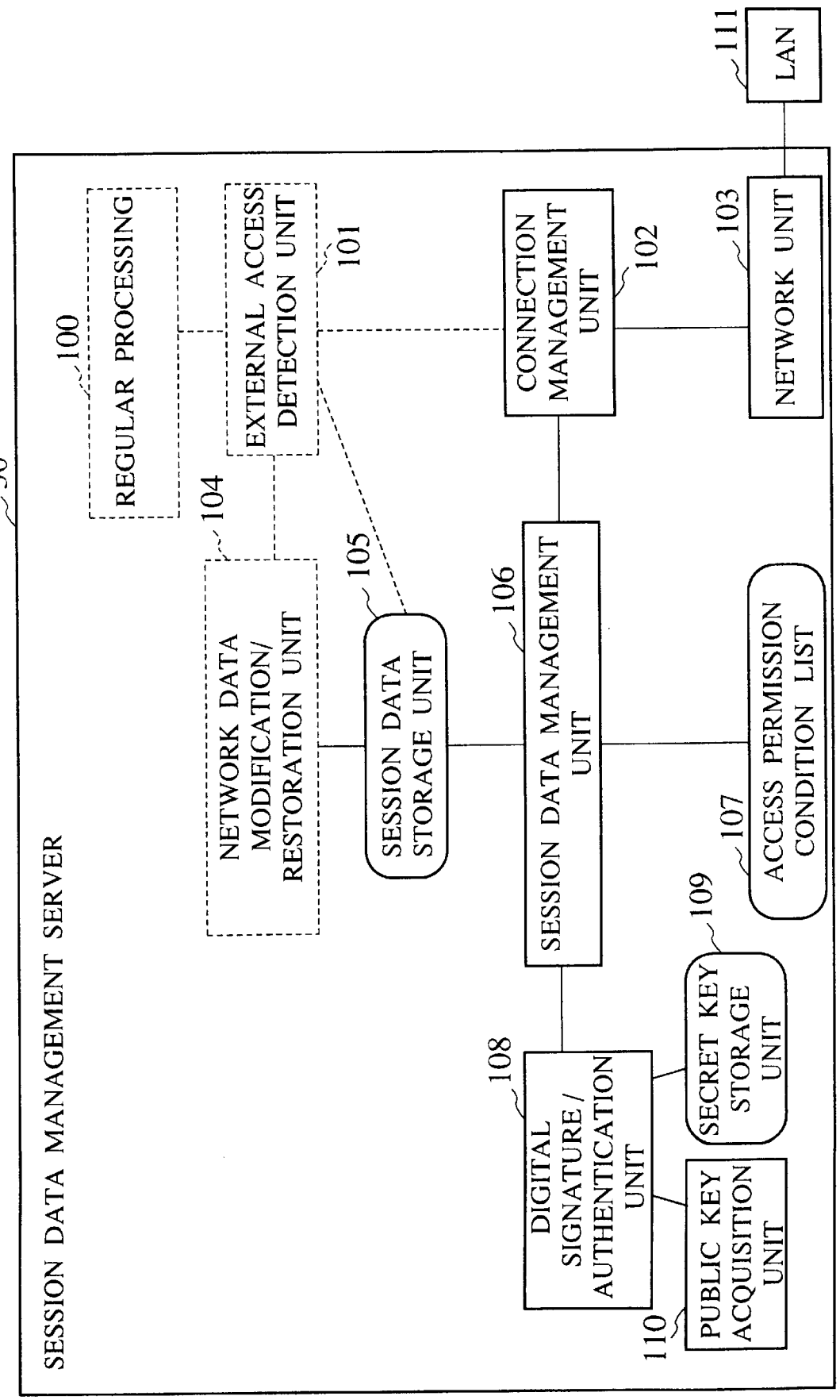
FIG. 5 is a block diagram of a functional configuration of a session data management server in the networking computer systems of FIG. 3.
Figure 6:
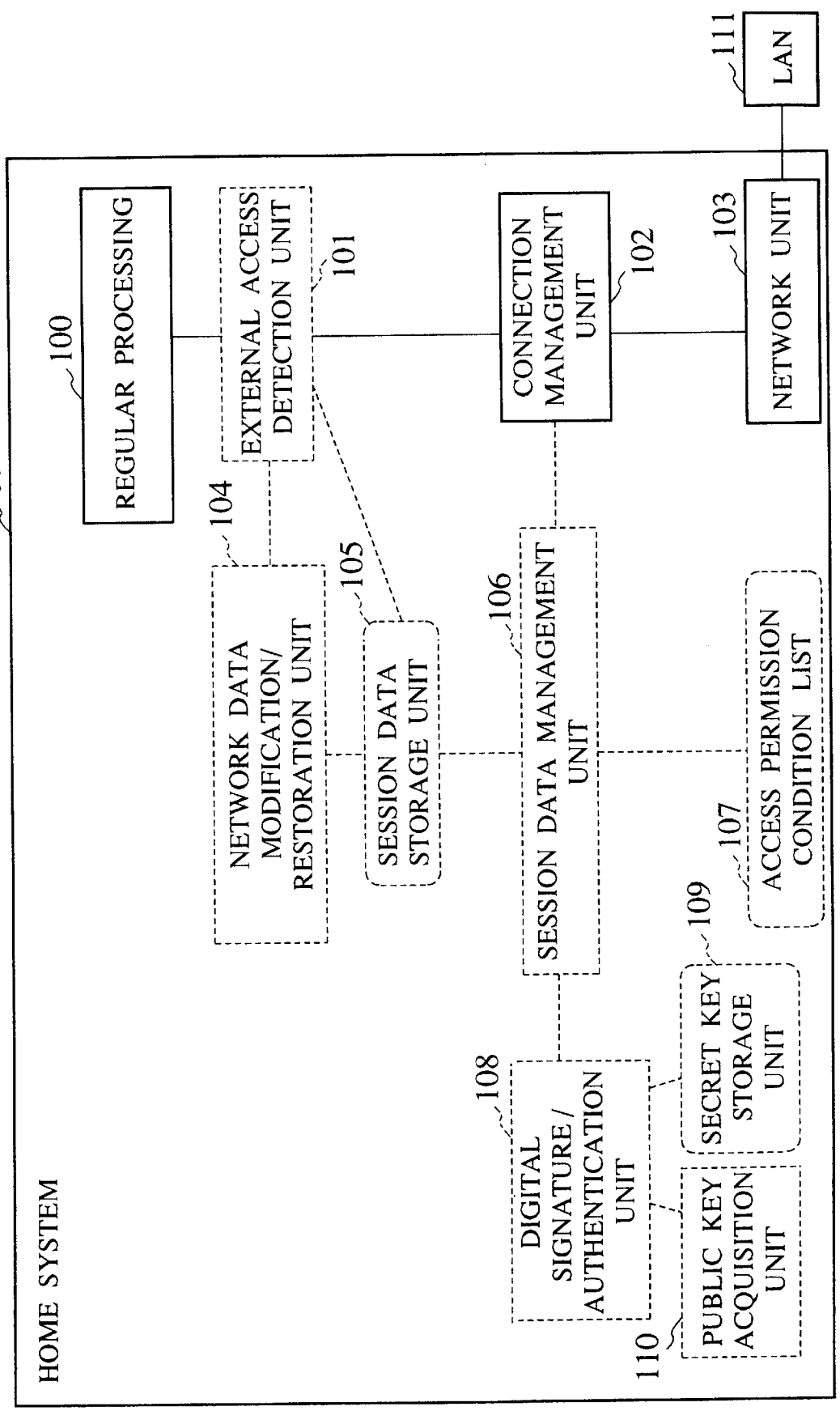
FIG. 6 is a block diagram of a functional configuration of a home system in the networking computer systems of FIG. 3.

Here, the security gateway 40 has an internal functional configuration as shown in FIG. 4, the session data management server 50 has an internal functional configuration as shown in FIG. 5, and each home system 60 has an internal functional configuration as shown in FIG. 6. In these FIGS. 4, 5, and 6, elements removed from the general configuration of FIG. 2 in each member are represented by dashed line enclosures, i.e., each member is formed without elements in dashed line enclosures as the corresponding functions are provided by the other members. In addition, the connection management unit 102 represented by a chain line enclosure in the security gateway 40 of FIG. 4 is optional.

It is to be noted that the remote system 4 in this configuration of FIG. 3 has the same internal functional configuration as that of FIG. 2 described above.

In this configuration of FIG. 3, each home system 60 as shown in FIG. 6 is substantially equivalent to the regular computer system. In other words, in this configuration of FIG. 3, the regular computer systems are used as the home systems 60, and the home system group 30 is formed by additionally providing the security gateway 40 and the session data management server 50.

Here, at least one session data management server 50 of FIG. 5 is provided in each home system group 30, in order to carry out the session set up processing necessary for the communication with the external location. After the session is successfully set up, the necessary data are stored in the session data storage unit 105. These data are also sent to and stored at the session data storage unit 105 in the security gateway 40 of FIG. 4 as well.

The security gateway 40 of FIG. 4 is a computer system located at a junction point between the home system group 30 and the external location, and the communication passing through this junction point is detected by the external access detection unit 101 in this security gateway 40. This communication can be judged by looking at the header data of the packet for the communication entered into this system, and checking the source network address and the destination network address contained therein. This packet is compared with the data in the session data storage unit 105 to judge whether it can pass through here.

The data which passed this checking at the external access detection unit 101 is passed through here after it is subjected to the necessary processing at the network data modification/restoration unit 104.

The communication necessary for the session set up is passed through the security gateway 40 and sent to the session data management server 50. The communication from the external at this point is limited only to that between the security gateway 40 and the session data management server 50.

It is also possible to use an internal functional configuration of the security gateway 40 without the connection management unit 102, in which the communication packet passing through the network unit 103 is directly checked at the external access detection unit 101.

Here, the security gateway 40 and the session data management server 50 may be constructed by an identical machine.

Figure 7:
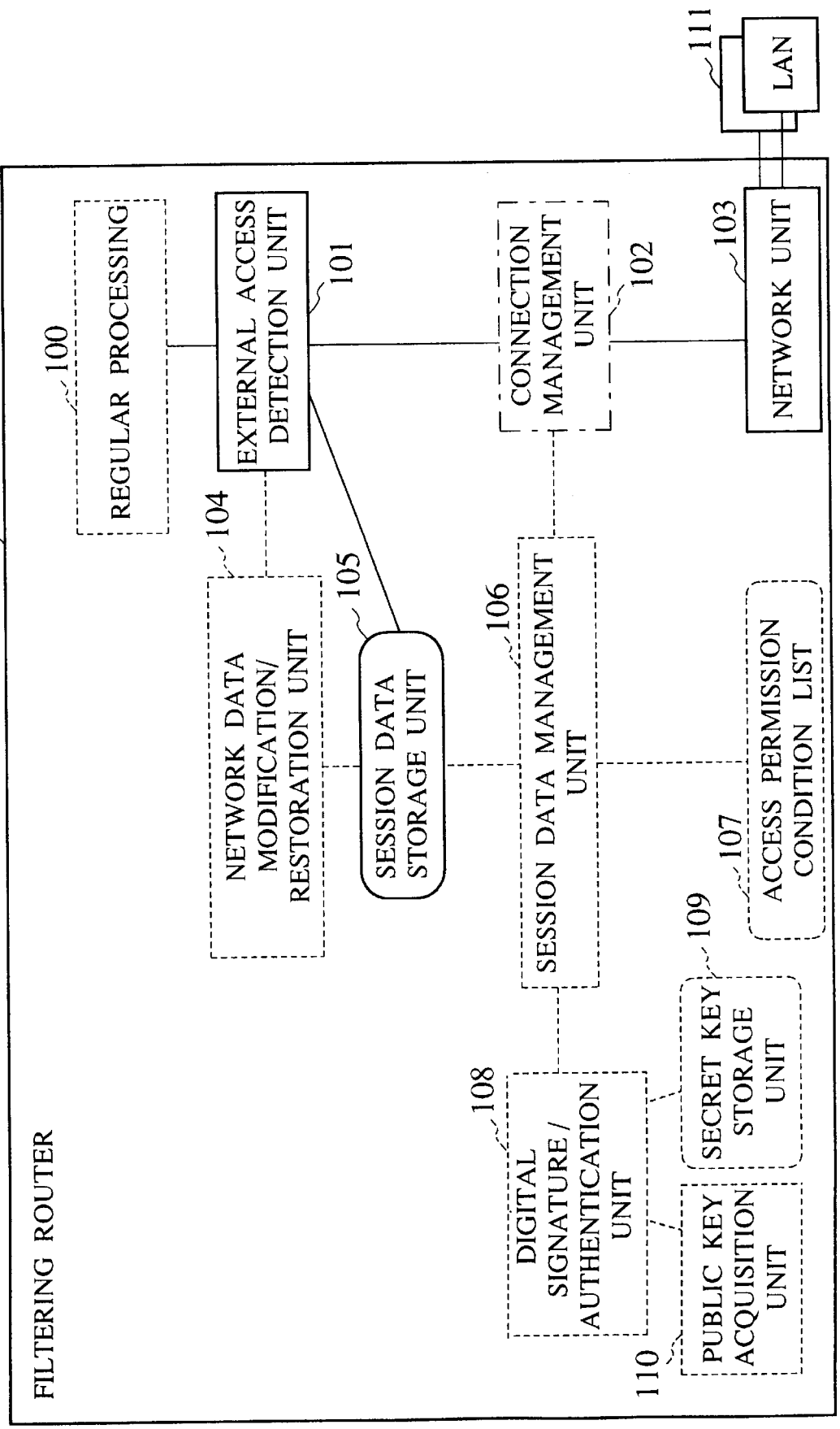
FIG. 7 is a block diagram of a functional configuration of a filtering router in networking computer systems of FIG. 9.
Figure 8:
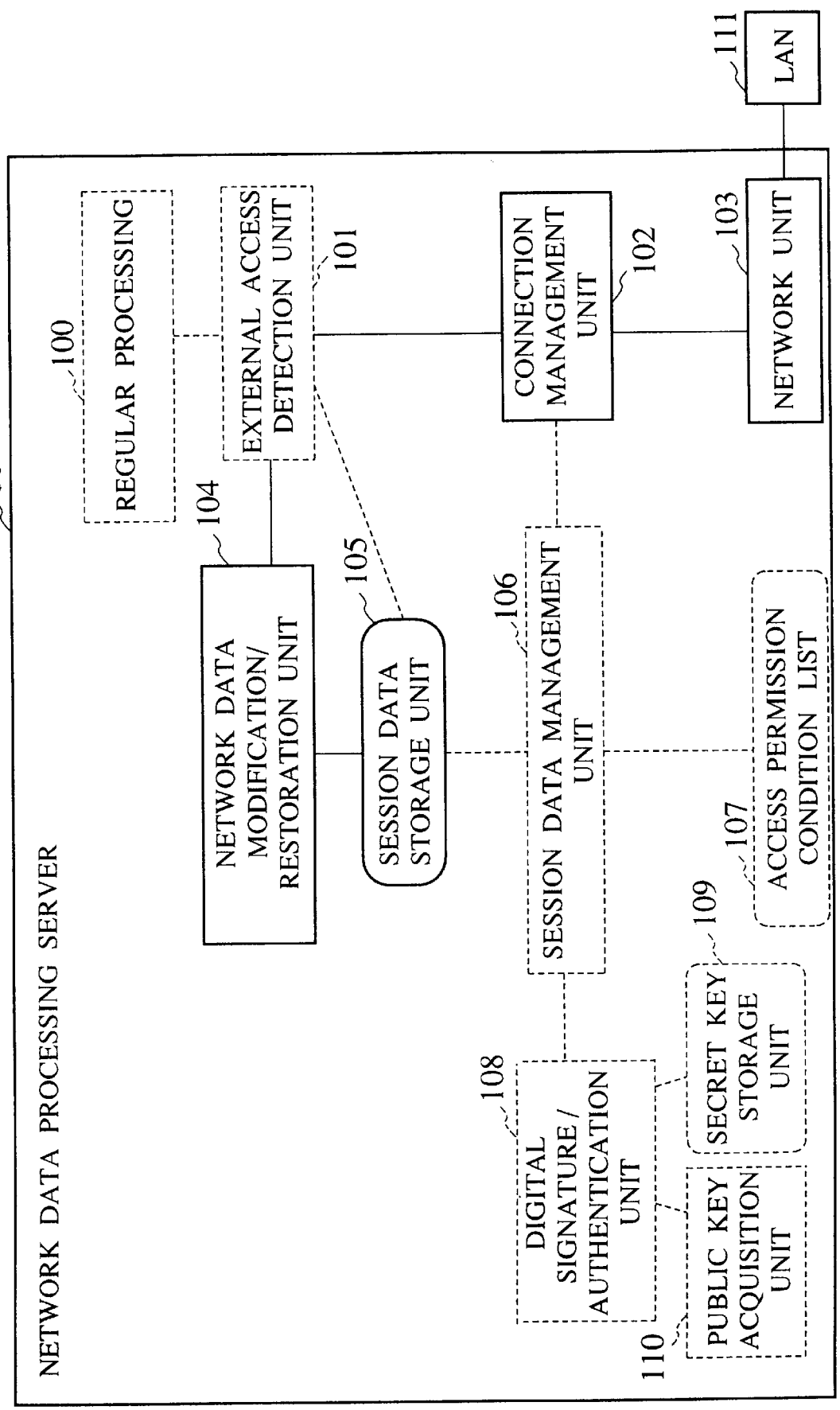
FIG. 8 is a block diagram of a functional configuration of a network data processing server in networking computer systems of FIG. 9.

It is also possible to divide the function of the security gateway 40 further, to separately implement a computer system called filtering router 70 as shown in FIG. 7 which has functions of the external access detection unit 101 and other functions associated with it, and a computer system called network data processing server 80 as shown in FIG. 8 which has functions of the network data modification/restoration unit 104, the session data storage unit 105, and other functions associated with them. In these FIGS. 7 and 8, elements removed from the general configuration of FIG. 2 in each member are represented by dashed line enclosures, i.e., each member is formed without elements in dashed line enclosures as the corresponding functions are provided by the other members. In this case, the overall configuration becomes as shown in FIG. 9 where the filtering router 70, the network data processing server 80 and the session data management server 50 are connected with the home systems 60 via routers 90.

In this case, the session data storage unit 105 is provided in both of the filtering router 70 and the network data processing server 80, as it is necessary in the functions of both. With the configuration of FIG. 7, it becomes easier to incorporate the function of the filtering router 70 into the existing conventional network router device. It is also possible for this filtering router 70 of FIG. 7 to further incorporate the connection management unit 102 optionally, just as in a case of the security gateway 40 of FIG. 4.

Figure 9:
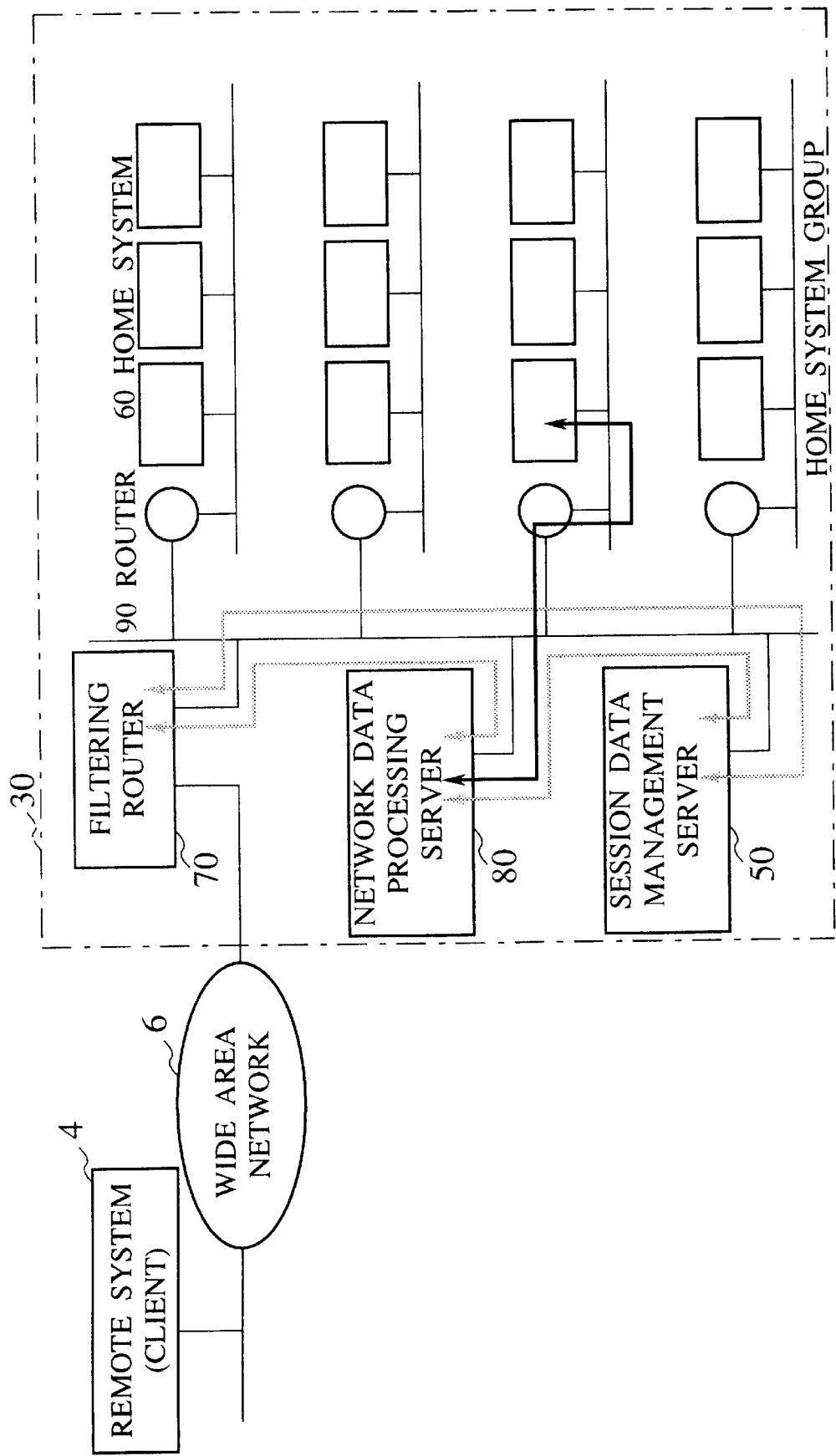
FIG. 9 is a block diagram of a modified configuration for the computer system of FIG. 3.

In the configuration of FIG. 9, the communication data from the external location are sent to the network data processing server 80 after the checking at the filtering router 70. Also, the communication data from the home system 60 in the home system group 30 to the external location are sent to the network data processing server 80 once, and then transmitted to the external location via the filtering router 70, as indicated by a dark arrow in FIG. 9. In other words, the home system 60 in the home system group 30 has the routing information data at the IP layer which is set to send the communication destined to the external location to the network data processing server 80 once.

In addition, for the communication data coming from the external location, the direct communication at the IP layer is limited only between the filtering router 70 and the network data processing server 80 or the session data management server 50, as indicated by pale arrows in FIG. 9.

Next, the operations of the above-described elements will be described in detail for the simpler configuration of FIG. 1. In this case, the overall operation has two steps of (I) session set up, and (II) communication using the session, which will be described separately.

(I) Session set up

Now, suppose that a certain user Ms. Tanaka has an account on the home system 2 (network address=A), and the user ID on this home system 2 is assumed to be "1". This user Ms. Tanaka also has an account on the remote system 4 (network address=B), and the user ID on this remote system 4 is assumed to be "101".

When this user Ms. Tanaka makes an access from the remote system 4 to the home system 2 for the purpose of log-in at the home system 2 or access to a resource (files, etc.) on the home system 2, before the actual desired processing, the session data management unit 106 of the remote system 4 negotiates with the session data management unit 106 of the home system 2 to obtain the access permission.

In this first embodiment, a unit in which this permission is given is referred as a session. In other words, when a communication from one user at one system and a communication to that one user at another system are permitted, a pair of these permitted communications is referred as a session.

The remote system 4 carries out the set up of the session in order for a user to make an access to the home system 2 of that user, and acquires a session ID. Thereafter, in the actual desired communication, it is possible to make an access to the home system 2 by using this session ID and the desired processing can be carried out there.

Figure 10:
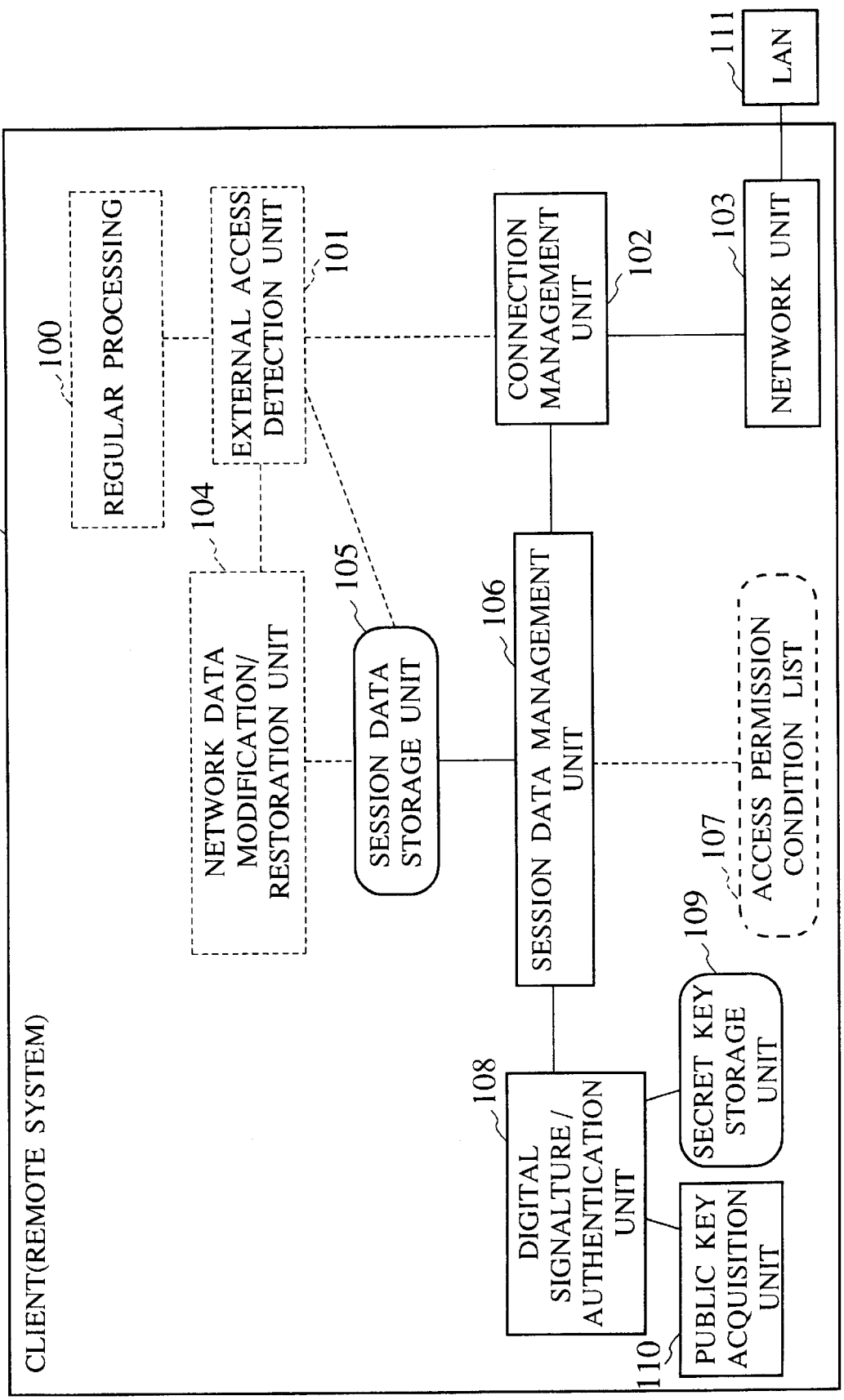
FIG. 10 is a block diagram of a functional configuration of a client side computer system in the networking computer systems of FIG. 1 at a time of a session set up operation.
Figure 11:
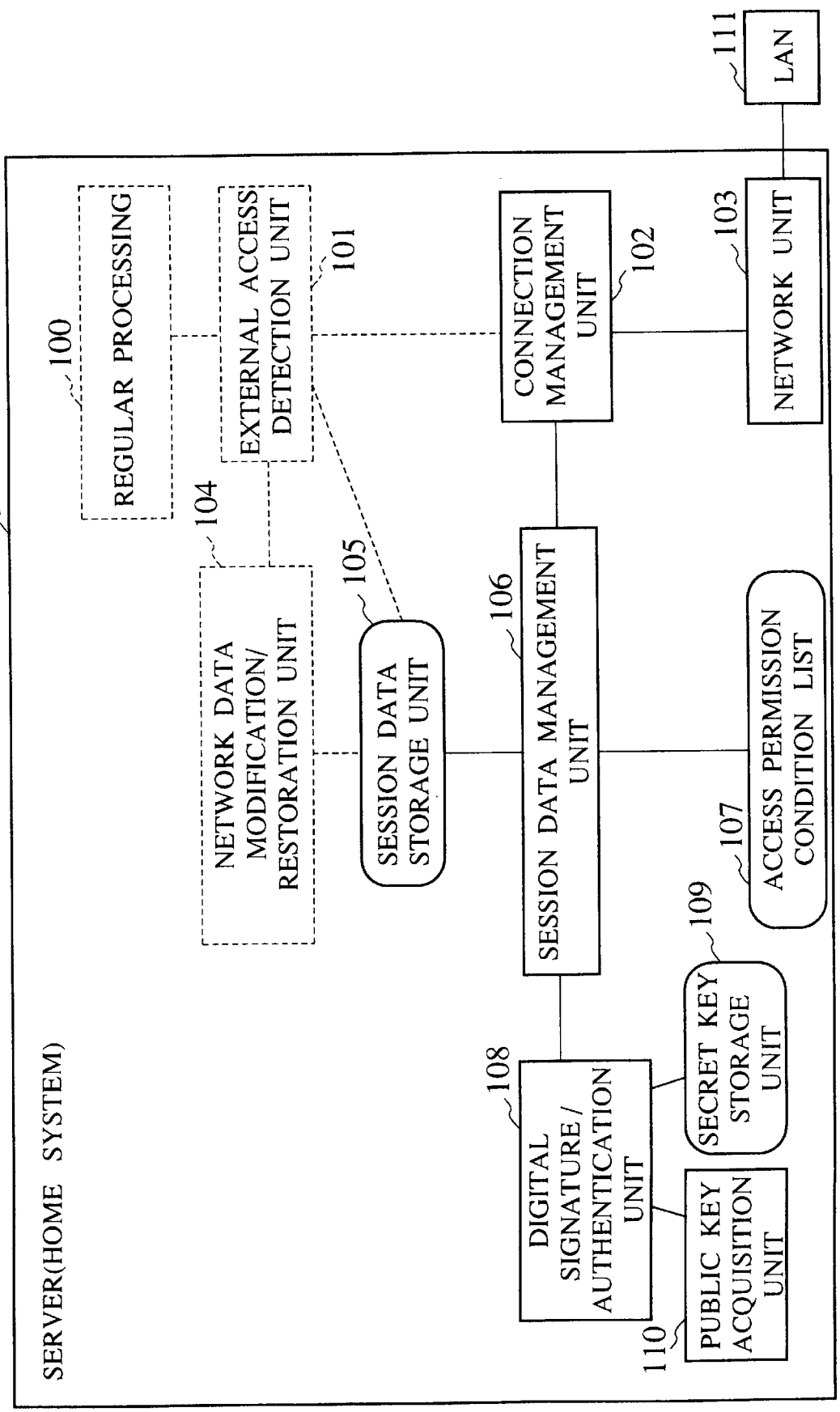
FIG. 11 is a block diagram of a functional configuration of a server side computer system in the networking computer systems of FIG. 1 at a time of a session set up operation.

In order to set up one session and obtain the session ID, the following operation is carried out. Here, the internal functional configuration 20-1 of a computer system on a client side (remote system 4) at a time of the session set up is shown in FIG. 10, while the internal functional configuration 20-2 of a computer system on a server side (home system 2) at a time of the session set up is shown in FIG. 11.

(I-1) Operation at client side (remote system 4): production and transmission of session request data The session data management unit 106 of the remote system 4 sets up the session with the home system 2 by a command from the regular processing 100, made either directly or indirectly by the user at the remote system 4. To this end, the session data management unit 106 of the remote system 4 transmits the request data for the session set up to the session data management unit 106 of the home system 2.

Here, the concrete examples of the data to be transmitted for the purpose of session set up in this first embodiment are as follows:

(1) A transmission source network address: the network address (=B) of the remote system 4;

(2) A user ID at the transmission source computer system: the own user ID (="101") at the remote system 4;

(3) A destination network address: the network address (=A) of the home system 2;

(4) A user ID at the destination computer system: the own user ID (="1") at the home system 2;

(5) A signature of the transmission source host: the signature data of the remote system 4; and (6) A signature of the transmission source user: the signature data of the user at the remote system 4.

Among these data for the session set up, the transmission source (system at hand, i.e., remote system 4) network address is stored in the network unit 103, and specified from there.

The user ID on the machine at hand is the user ID which requested the session set up, which is managed by the user management unit (not shown) provided in the regular processing 100. This user ID is going to be the data for the machine at hand.

The network address of the destination computer system (home system 2) and the user ID at that machine are the network address and the user ID at the computer system (home system 2) with which this session is to be set up.

These data are notified directly or indirectly by the user who is wishing to set up this session.

The signature of the transmission source host is signed by producing data in which the network address of the remote system 4, the network address of the home system 2, and date and time of production of this data are encrypted by a host secret key of the remote system 4 (system at hand).

The signature of the transmission source user is signed by producing data in which the user ID at the remote system 4, the user ID at the home system 2, and a date and time of production of this data are encrypted by a secret key of this user Ms. Tanaka.

In this first embodiment, the signatures of the computer system and the user are produced at the digital signature/authentication unit 108 in the transmission source computer system (system at hand, i.e., remote system 4).

As for the encryption key necessary for the digital signing, the host secret key of the system at hand (remote system 4) and the user secret key are obtained from the secret key storage unit 109. The user's personal secret key is entered and stored in the secret key storage unit 109 at a moved site in advance when the user moved.

(I-2) Operation at server side (home system 2): receiving session request data and set up of session The session request data produced at the session data management unit 106 of the remote system 4 by the above operation I-1 is sent to the home system 2 via the connection management unit 102, the network unit 103, and the LAN 111 of the remote system 4, and the wide area network 6.

Then, this session request data reaches to the session data management unit 106 of the home system 2 via the LAN 111, the network unit 103, and the connection management unit 102 of the home system 2.

At this session data management unit 106 of the home system 2, the authentication of the transmission source host and user which requested the session set up is carried out to judge whether the actual desired processing is allowed to be executed. More specifically, the following processings x-1 to x-7 are carried out here.

Processing x-1: The authentication of the transmission source host and the transmission source user in the received data is carried out.

Processing x-2: Using a timer (not shown), whether the received data is within a valid period or not is checked.

Processing x-3: When the conditions of the processings x-1 and x-2 are satisfied, the received data is compared with a content of the access permission condition list 107 as shown in FIG. 12, to judge whether the host and the user of the requesting source are permitted to make accesses to this system subsequently. Processing x-4: When the access is permitted, a session is newly generated, and a session ID is assigned.

Processing x-5: The data concerning this session are stored in the session data storage unit 105. The stored data includes a newly generated session key (a temporary cipher key which is valid only during this session) which will be necessary in the subsequent actual desired communication. Here, the concrete examples of data stored in the session data storage unit 105 are shown in FIG. 13, which include the following:

(1) A user ID at this computer system (home system 2);

(2) A network address of a corresponding external computer system (remote system 4);

(3) A user ID at a corresponding external computer system (remote system 4);

(4) A session ID of this session;

(5) A session key valid for this session; and (6) A valid period.

Processing x-6: When the session is successfully set up, a reply data to notify the permission of the access is produced and sent to the session request source computer system (remote system 4). Here, the concrete examples of the data contents contained in the reply data are as follows:

(1) A transmission source network address: the network address (=A) of the home system 2;

(2) A user ID at the transmission source computer system: the own user ID (="1") at the home system 2;

(3) A destination network address: the network address (=B) of the remote system 4;

(4) A user ID at the destination computer system: the own user ID (="101") at the remote system 4;

(5) A signature of the transmission source host: the signature data of the home system 2;

(6) A signature of the transmission source user: the signature data of the user at the home system 2;

(7) A session ID: an ID for identifying this session;

(8) A session key: a temporal cipher key valid in this session; and (9) A valid period: a period in which this session is valid.

At this point, in order to specify the transmission source (i.e., in order to check that it is not a false home system), the signatures of the host name and the user name of the transmission source are attached. A manner of attaching the signature here is the same as that for producing the signature at a time of the session set up request. At the same time, the session key to be sent is encrypted by a public key of the destination host (remote system 4) and a secret key of the transmission source host (home system 2) in order to prevent a reading of the session key by the other host.

Processing x-7: When session set up fails as the access permission conditions are not satisfied, data for notifying this fact is returned to the computer system (remote system 4) which is the transmission source of the session set up request.

In the above operation, the authentication processing of the processing x-1 can be carried out in further detail as follows.

For the authentication of the transmission source host (remote system 4), the signature data for the host authentication among the received data is used. This signature data is decrypted by the public key of the remote system 4. When the transmission source host address and the destination host address written in the decrypted plain text coincide with the addresses of the remote system 4 and the home system 2, respectively, and the date and time data written in the decrypted plain text is within a predetermined period of time from a current time at which this authentication processing is carried out, it is judged as the success of the authentication.

For the authentication of the user at the transmission source host, the data for the user authentication among the received data is used. According to the destination user ID data, the user name corresponding to the user ID of this system (home system 2) is obtained from the user management unit (not shown) provided in the regular processing 100, and the public key corresponding to that user name is obtained from the public key acquisition unit 110, and then the data for the user authentication is decrypted by using the obtained public key.

When the user ID at the transmission source (remote system 4) and the user ID at the destination (home system 2) written in the decrypted plain text coincide with the respective user IDs in the request data, and the date and time data written in the decrypted plain text is within a predetermined period of time from a current time at which this authentication processing is carried out, it is judged as the success of the authentication.

The public key of the user and the public key of the remote system 4 are obtained from the public key acquisition unit 110. If the corresponding public keys are not stored at the public key acquisition unit 110, they are obtained from an external public key server (not shown) through the network unit 103.

(I-3) Operation at client side (remote system 4): receiving reply data for the session set up request The remote system 4 receives the reply data with respect to the session set up request from the home system 2. At the session data management unit 106 of the remote system 4, necessary data are stored into the session data storage unit 105 from the received data. Here, the concrete examples of data stored in the session data storage unit 105 include the following:

(1) A user ID at this computer system (remote system 4);

(2) A network address of a corresponding external computer system (home system 2);

(3) A user ID at a corresponding external computer system (home system 2);

(4) A session ID of this session;

(5) A session key valid for this session; and (6) A valid period.

The host signature and the user signature in the received data are checked to confirm that it is the proper reply from the session set up request target host. A manner of signature authentication here is the same as in the processing x-1 described above. In addition, the received session key is encrypted, so that it is decrypted by using the secret key of this host (remote system 4) and the public key of the request target host (home system 2). A manner of decryting here is the same as in the processing x-1 described above.

(II) Communication using session

Figure 14:
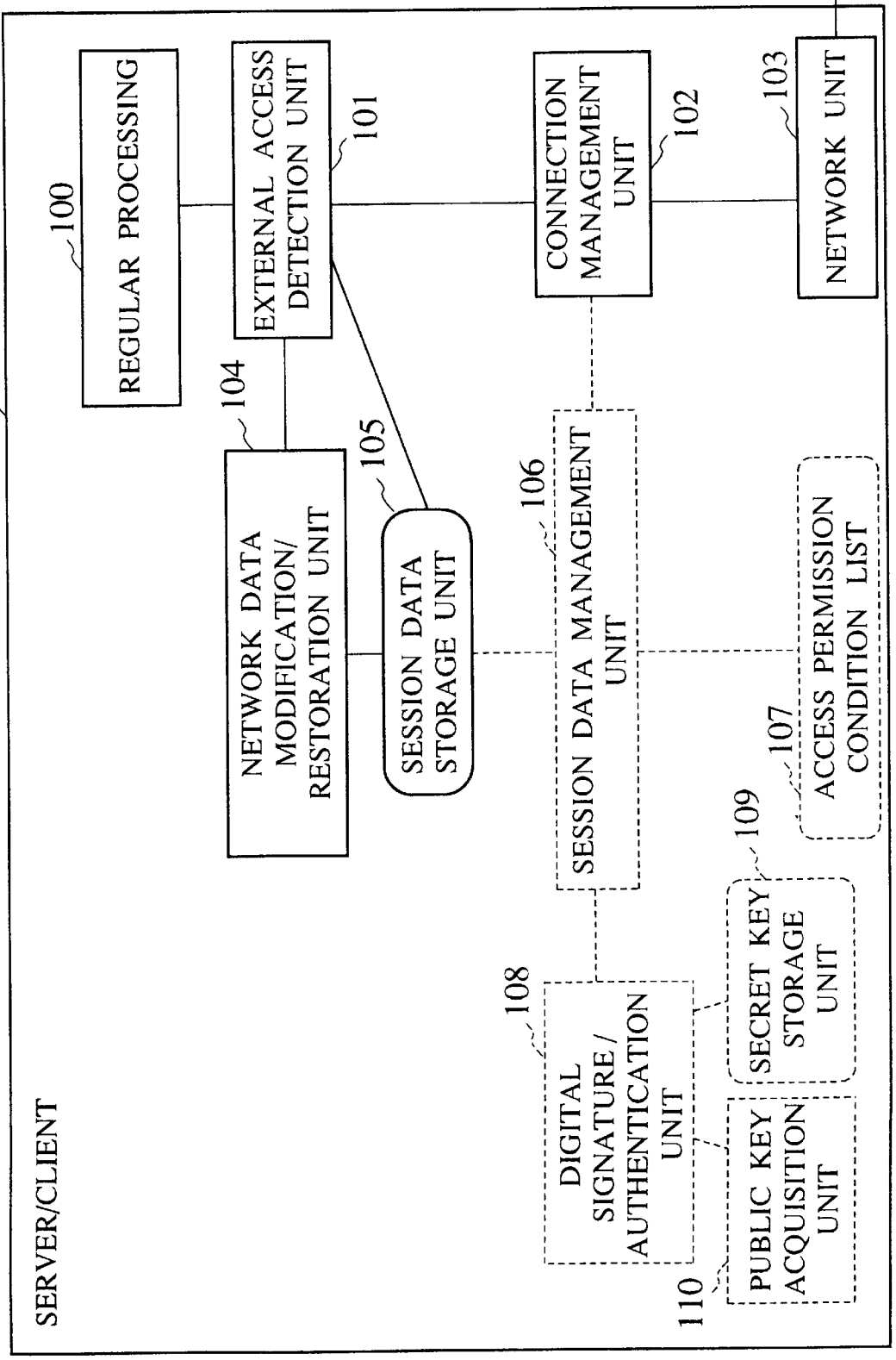
FIG. 14 is a block diagram of a functional configuration of a computer system in the networking computer systems of FIG. 1 at a time of a communication using session.

When the session set up procedure described above is finished, the desired processing can be started. Here, the operation at the client side is described first, and the operation at the server side will be described later. In this operation, the internal functional configuration 20-3 of a computer system which is common to both a client side (remote system 4) and a server side (home system 2) is shown in FIG. 14.

(II-1) Operation at client side (II-1-1) Transmission

The permitted external computer system (remote system 4) transmits the data to the home system 2. Here, the transmission data are produced at the regular processing 100, and transmitted to the external access detection unit 101 without any special processing.

Then, at the external access detection unit 101, the destination of the transmission data is detected. When the connection management unit 102 is carrying out the processing of the TCP, this connection management unit 102 manages a network address of the host of the connection target and the port number of the TCP for each communication connection, so that these information can be obtained from the connection management unit 102. The external access detection unit 101 compares the transmission data with the data stored in the session data storage unit 105 to judge whether this transmission data is destined to the external location or not.

When this transmission data is destined to the external location, this transmission data is sent to the network data modification/restoration unit 104 and modified there. On the other hand, when this transmission data is destined to the internal location, this transmission data passes through the external access detection unit 101 and transmitted to the destination via the connection management unit 102, the network unit 103, and the LAN 111 as in a usual communication.

At the network data modification/restoration unit 104, the necessary processing is applied to the transmission data. For example, the so called MAC (Message Authentication Code) for indicating that it is the data from the permitted external host to the destination (home system 2) of this data can be attached along with the session ID, and the session key stored in the session data storage unit 105 for each destination can be used in obtaining this MAC. Namely, by using this session key, the hush function value of the transmission data can be calculated and set as the MAC value. Here, a manner of calculating the hush function value is according to the MD5 defined by RFC 1321.

In addition, depending on the importance of the transmission data and the intermediate transmission path, it is necessary to apply the cipher processing in order to prevent the wiretapping of the data. In that case, the transmission data itself is encrypted according to the DES scheme for example by using the same session key that is used for generating the MAC.

In either case, the transmission data is modified, so that the packet format of the transmission data is changed accordingly if necessary.

The transmission data destined to the external that is modified at the network data modification/restoration unit 104 is then returned to the external access detection unit 101 again, and then transmitted to the destination (home system 2) via the connection management unit 102, the network unit 103, and the LAN 111 of the remote system 4, and the wide area network 6.

In the above operation, the external access detection unit 101 compared the data destined to the external with the data stored in the session data storage unit 105, but it is possible to simply this operation to detect the data destined to the external location as follows. Namely, the network addresses in a range which are utilized by the home system group are stored in the external access detection unit 101 in advance, and whether the communication data is destined to the external location or not is judged according to these stored network addresses. The data which is judged as destined to the external location is then sent to the network data modification/restoration unit 104, and compared with the data in the session data storage unit 105 there to judge whether it is actually the data of the communication for which the access to the external location is permitted, and if so, the processing such as the attaching of the MAC is carried out there.

(II-1-2) Reception

The received data from the external data (home system 2) reaches to the external access detection unit 101 through the LAN 111, the network unit 103, and the connection management unit 102. Then, at this external access detection unit 101, whether it is the communication from the external location or not is detected, and whether it is the communication for which the access from the external location is permitted or not is checked. The information necessary for this judgement is obtained from the session data storage unit 105.

When it is the data from the internal location, this data passes through the external access detection unit 101, and reaches to the regular processing 100.

On the other hand, when it is the data from the external location, this data is sent to the network data modification/ restoration unit 104, and a processing to restore the data is applied according to the need. The information necessary for this restoration is obtained from the session data storage unit 105. Then, after the restoration, this data is given to the regular processing 100 in this system via the external access detection unit 101.

More specifically, the transmission source of the data which passed the connection management unit 102 is checked at the external access detection unit 101. When the connection management unit 102 is carrying out the processing of the TCP, this connection management unit 102 manages a network address of the host of the connection target and the port number of the TCP for each communication connection, so that these information can be obtained from the connection management unit 102. In other words, the IP addresses of the destination and the transmission source are obtained from the header data of the IP packet, and the port numbers of the destination and the transmission source are obtained from the header data of the TCP. These data are compared with the data in the session data storage unit 105 to judge whether it is an access from the external location or not is judged.

When the MAC is contained in the data, whether it is the communication for which the access from the external location is permitted or not can be checked according to this MAC. Similarly as in a case of generating the MAC, the session ID is obtained from this data, and the session key corresponding to this session ID is obtained from the session data storage unit 105. Then, using the obtained session key, the same calculation as in a case of generating the MAC is carried out. When this calculation result coincides with the MAC value written in the data, it can be judged as a proper access.

(II-2) Operation at server side

The operation at the server side is substantially the same as in the client side described above.

Here, however, the user ID conversion processing for converting the user ID written in the data from the user ID at the remote system 4 into the user ID at the home system 2, or converting the user ID at the home system 2 in the data to be transmitted to the external location into the user ID at the remote system 4 is also carried out at the network data modification/restoration unit 104. As a result, in the regular processing 100, it becomes possible to make the file manipulation such as the copying of the file system by the remote file transfer and the access such as the remote log-in, under the access right of that user ID at the home system 2.

Next, the second embodiment of a user identification data management scheme for networking computer systems according to the present invention will be described in detail.

In this second embodiment, the networking computer systems have the same overall configuration as that of FIG. 1 described above, which includes a computer system called home system (server) 2 which is usually utilized by a user, and a computer system called remote system (client) 4 which is located at a geographically distanced external location. This user is normally working on the home system 2, but in a case of conference, etc., this user goes out to the distanced location and works on the remote system 4.

The home system 2 and the remote system 4 are connected together by a wide area network 6 through LAN-A 8 and LAN-B 10 directly connected to the home system 2 and the remote system 4, respectively. The communication between the home system 2 and the remote system 4 is connected by a standard network protocol TCP/IP. Here, the home system 2 is connected with the wide area network 6 at a network address A, while the remote system 4 is connected with the wide area network 6 at a network address B.

In this configuration of FIG. 1, the standard network services can be utilized from either computer system. In this second embodiment, a case of using particular network services called a remote file transfer program (FTP) and a remote log-in program (TELNET) will be described. Each of these programs is formed by a client program to be activated by a user and a server program which is activated in advance and awaiting a service request from a client.

The home system 2 and the remote system 4 are belonging to different organizations, so that their managements are independent from each other, and consequently they are managed under different management schemes for user management (registration and/or deletion of user ID, etc.) and file management (setting of file access control for each file, limiting of file access for each user according to the access control setting, etc.).

As for a type of a computer system, the home system 2 and the remote system 4 may be computer systems of the same type, or computer systems of different types. For example, when the home system 2 and the remote system 4 are both workstation systems, the home system 2 can be a main frame system while the remote system 4 is a workstation system.

In the following description of this second embodiment, both of these computer systems are assumed to be installed on a UNIX system, although they may very well be constructed on any other OS as long as the TCP/IP is supported and the services such as FTP and TELNET are provided.

Figure 15:
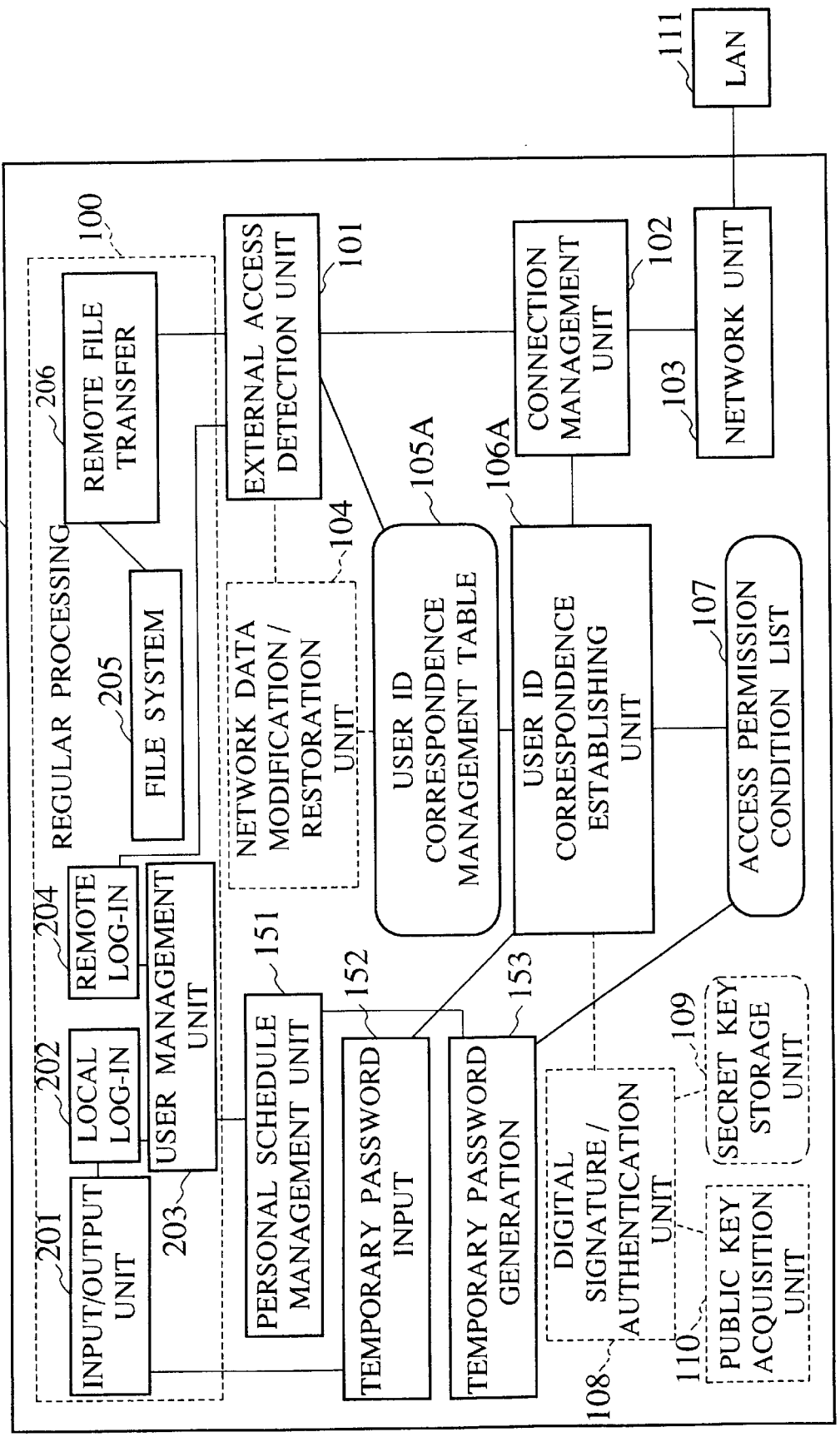
FIG. 15 is a block diagram of a functional configuration of a computer system (home system or remote system) in networking computer systems according to the second embodiment of the present invention.

In this second embodiment, the home system 2 and the remote system 4 have the identical internal functional configuration 150 as shown in FIG. 15, which differs from that of FIG. 2 described above in that the regular processing 100 includes an input/output unit 201, a local log-in 202 connected with the input/output unit 201, a user management unit 203 connected with the local log-in 202, a remote log-in connected with the user management unit 203 and the external access detection unit 101, a file system 205, and a remote file transfer 206 connected with the file system 205 and the external access detection unit 101. In addition, this configuration 150 of FIG. 15 includes a user ID correspondence management table 105A corresponding to the session data storage unit 105 of FIG. 2 and a user ID correspondence establishing unit 106A corresponding to the session data management unit 106 of FIG. 2, while the network data modification/restoration unit 104, the digital signature/ authentication unit 108, a secret key storage unit 109, and the public key acquisition unit 110 of FIG. 2 are omitted as indicated by dashed line enclosures. Moreover, this configuration 150 of FIG. 15 further includes a personal schedule management unit 151 connected with the user management unit 203, a temporary password input 152 connected with the input/output unit 201 and the user ID correspondence establishing unit 106A, and a temporary password generation 153 connected with the personal schedule management unit 151 and the access permission condition list 107.

Here, the input/output unit 201 is formed by input devices and output devices for enabling a direct use of the computer system 2 or 4 by the user. As the input devices, a keyboard, a mouse, a serial transmission line, etc. can be utilized, while as the output devices, a display, a printer, a serial transmission line, etc. can be utilized. This input/output unit 201 is connected to the other elements in the configuration of 150 through the local log-in 202.

Next, the operations of the above described elements will be described in detail.

Now, suppose that a certain user Ms. Tanaka has an account on the home system 2 (network address=A), and the user ID on this home system 2 is assumed to be "1". This user Ms. Tanaka also has an account on the remote system 4 (network address=B), and the user ID on this remote system 4 is assumed to be "101".

Figure 16:
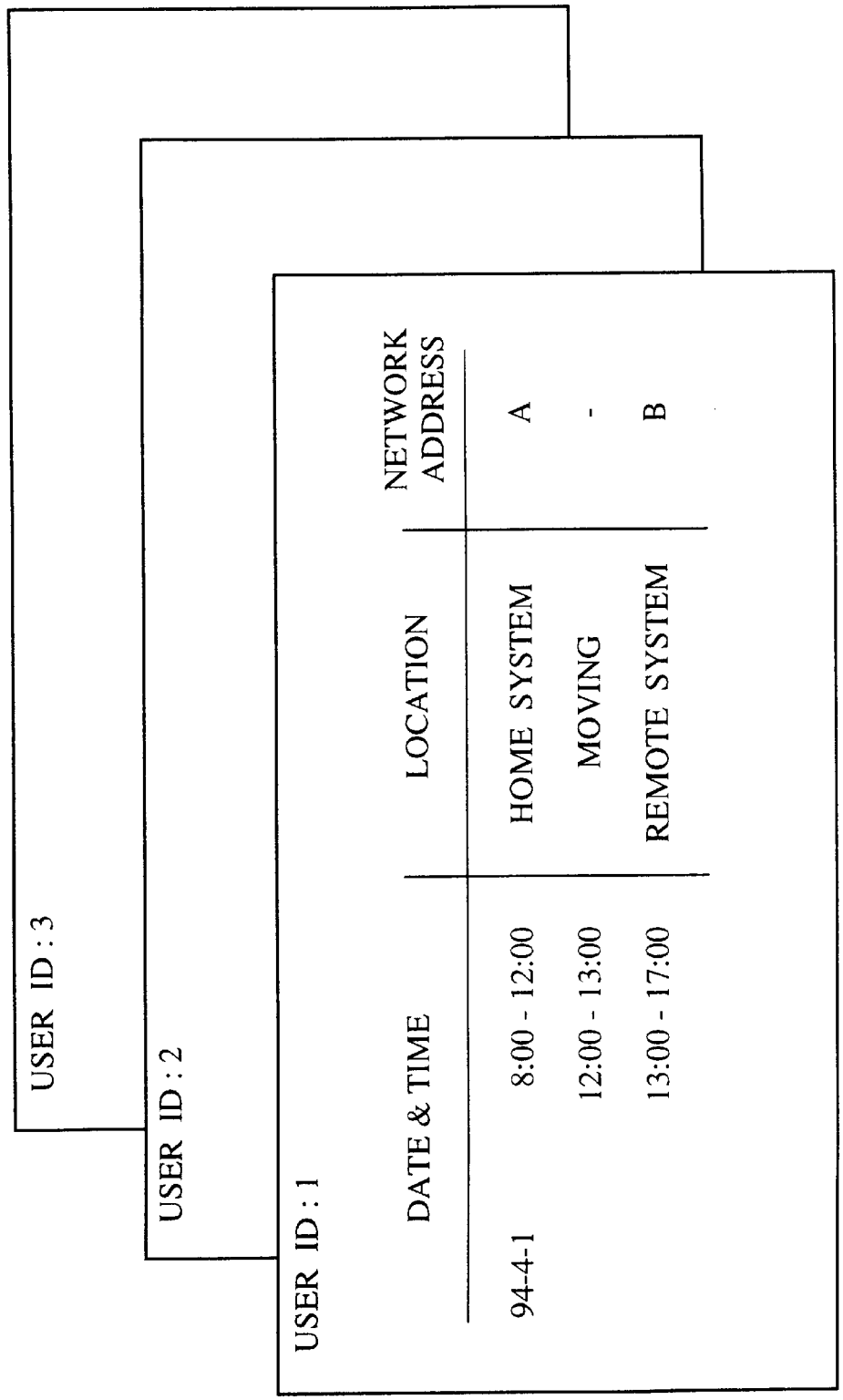
FIG. 16 is a diagrammatic illustration of a schedule management table used at a personal schedule management unit in the computer system of FIG. 15.

On the home system 2, the personal schedule management unit 151 is operating to manage a personal schedule of each user. This personal schedule management unit 151 has a schedule management table as shown in FIG. 16 for each user in which a schedule of each user is registered in advance. In an example shown in FIG. 16, Ms. Tanaka (user ID=1) is scheduled to go out to the remote system 4 and work there this afternoon.

At a time of going out, Ms. Tanaka receives a temporary password which is issued by the temporary password generation 153 of the home system 2 and which will be necessary in using the home system 2 from the remote system 4. Here, the temporary password generation 153 issues the temporary password by carrying out the following processings a-1 to a-6.

Processing a-1: A user ID of a requesting user is obtained.

Processing a-2: A schedule data for that user ID is obtained from the personal schedule management unit 151.

Processing a-3: A network address of an external system located at where she is going and a time for which she will be out there are obtained from the schedule management table.

Processing a-4: A temporary password (corresponding to the session key of the first embodiment described above) for identifying where she is going is generated, and a valid period of this temporary password is calculated.

Processing a-5: In the access permission condition list 107, "user ID", "network address of external system", "temporary password", "valid period", and other information (permission conditions for file reading only, etc.) are registered as shown in FIG. 17.

Processing a-6: The temporary password is given to the requesting user.

Next, the operation of the user Ms. Tanaka at the remote system 4 to which she has moved will be described.

In this case, the user Ms. Tanaka goes out to an external location and uses the remote system 4 provided there to do her work. Here, the user Ms. Tanaka carries out the desired processing by creating a user account on the remote system 4 or by using the user ID created and used before. In this example, the user ID of Ms. Tanaka is assumed to be "101".

Figure 18:
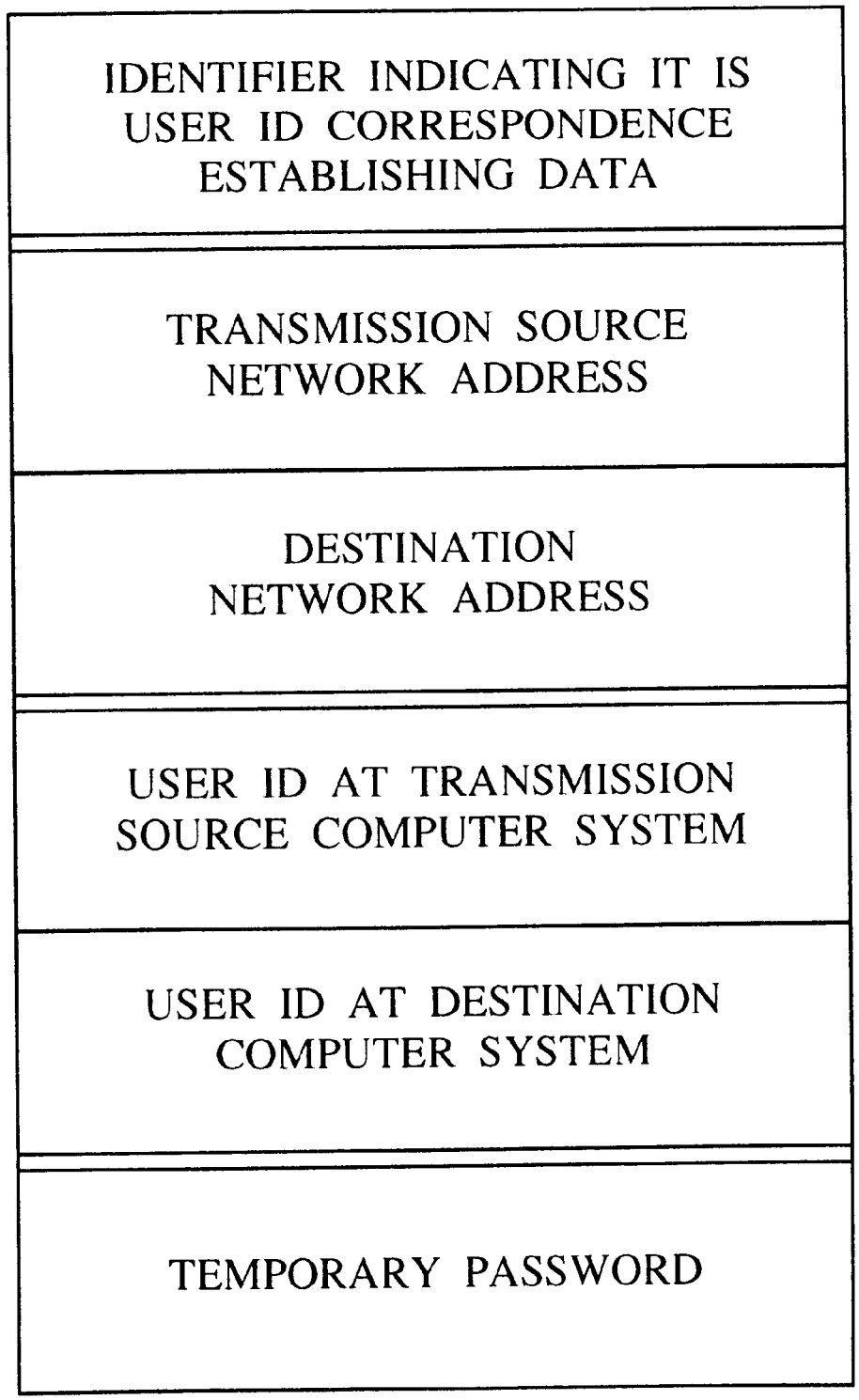
FIG. 18 is a diagrammatic illustration of a user ID uniformization request data used in the computer system of FIG. 15.

When the user Ms. Tanaka makes an access from the remote system 4 to the home system 2, upon an activation by the user Ms. Tanaka who is working at the remote system 4, the user ID correspondence establishing unit 106A of the remote system 4 produces a data for a user ID correspondence establishing request as shown in FIG. 18 for the purpose of the user ID correspondence establishing which corresponds to the session set up of the first embodiment described above, sets up a connection with the user ID correspondence establishing unit 106A of the home system 2, and carries out the user ID correspondence establishing operation.

Here, the concrete examples of the data for the user ID correspondence establishing request in this second embodiment are as follows:

(1) A transmission source network address: the network address (=B) of the remote system 4;

(2) A user ID at the transmission source computer system: the own user ID (="101") at the remote system 4;

(3) A destination network address: the network address (=A) of the home system 2;

(4) A user ID at the destination computer system: the own user ID (="1") at the home system 2; and (5) A temporary password obtained from the temporary password generation 153 at the destination.

Among these data for the user ID correspondence establishing request, the transmission source (system at hand, i.e., remote system 4) network address and user ID can be automatically produced, that is, the own network address is stored in the network unit 103, while the user ID is stored in the user management unit 203. The temporary password issued from the temporary password generation 153 of the destination computer system (home system 2) is entered by the user into the temporary password input 152 and can be obtained from there.

Next, at the home system 2 side which received the data for the user ID correspondence establishing request from the remote system 4, the judgement and the registration for the user ID correspondence establishing are made by carrying out the following processings b-1 to b-5 at the user ID correspondence establishing unit 106A.

Processing b-1: Whether the received data matches with the content of the access permission condition list 107 as shown in FIG. 17 or not is checked.

Processing b-2: Using a timer (not shown), whether a present time is within a valid period or not is checked.

Processing b-3: If there are other conditions, whether these other conditions are satisfied or not is checked.

Processing b-4: When the conditions of the processings b-1, b-2, and b-3 are satisfied, the access permission data as shown in FIG. 19 is registered into the user ID correspondence management table 105A, and the access permission is notified to the transmission source computer system (remote system 4).

Here, the concrete examples of access permission data registered in the user ID correspondence management table 105A are as follows:

(1) A user ID at this computer system (home system 2);

(2) A network address of a corresponding external computer system (remote system 4);

(3) A user ID at a corresponding external computer system (remote system 4);

(4) A valid period; and (5) Other information.

Processing b-5: When the conditions of the processings b-1, b-2, and b-3 are not satisfied, data for notifying this fact is returned to the computer system (remote system 4) which is the transmission source of the user ID correspondence establishing request.

Thereafter, the commands are related to the desired processing from the user ID at the permitted external computer system (remote system 4). Here, the access is made under the access right of the user ID corresponding to this computer system (home system 2) according to the user ID correspondence management table 105A described above. By means of this, it becomes possible to make the file manipulation such as the copying of the file system by the remote file transfer and the access such as the remote log-in, for instance.

Figure 20:
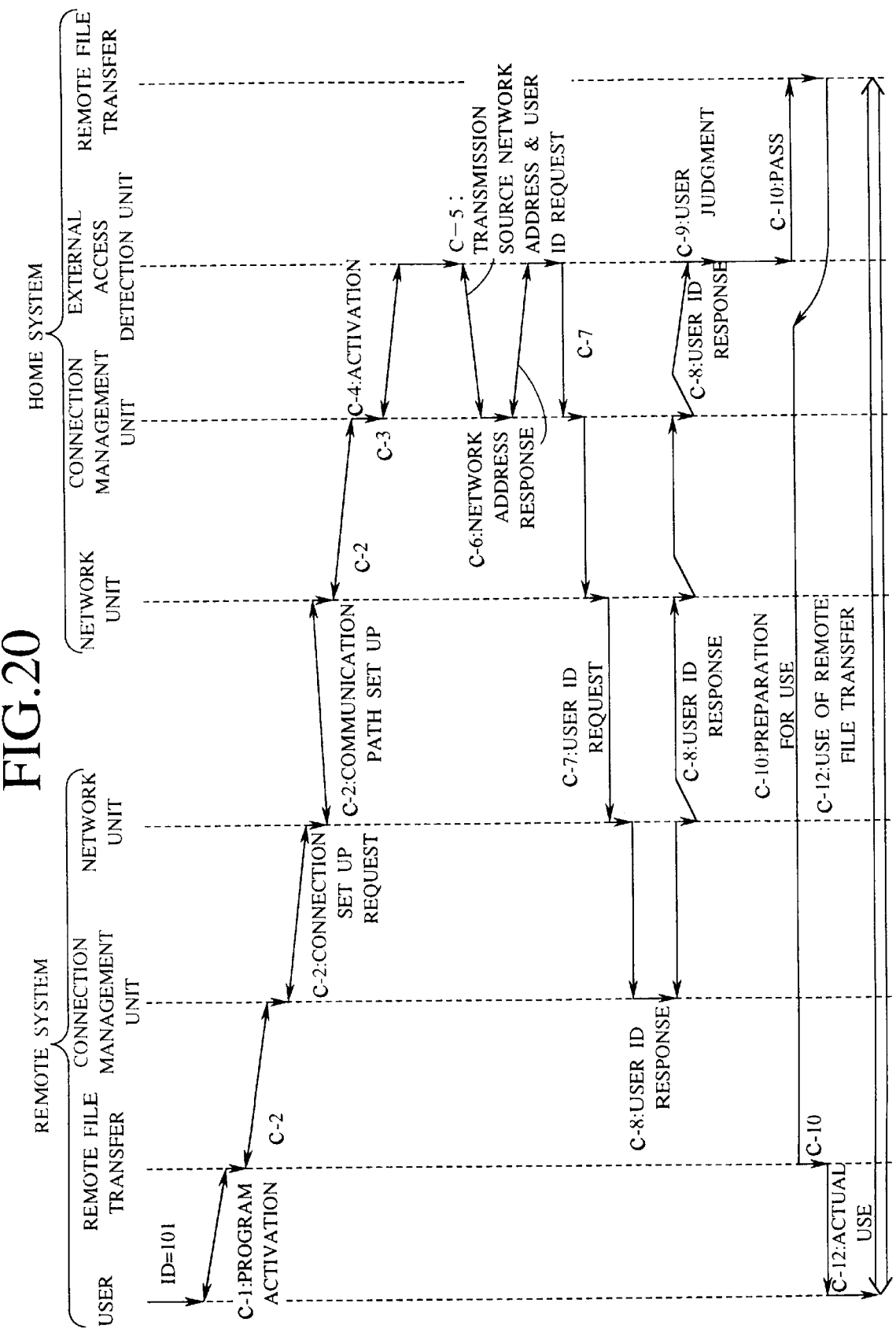
FIG. 20 is a sequence chart of a procedure for utilizing a remote file transfer from a remote system according to the second embodiment of the present invention.

Here, in an exemplary case in which the user Ms. Tanaka who is utilizing the remote system 4 uses the remote file transfer program in order to make a copy of a file in the home system 2, the procedure of this second embodiment is carried out according to a sequence chart of FIG. 20 by the following processings c-1 to c-12.

Processing c-1: The user Ms. Tanaka activates the remote file transfer 206 of the remote system 4 (client side) under the right of the user ID="101".

Processing c-2: The remote file transfer program then sets up a communication path with the target computer system (home system 2) via the external access detection unit 101, the connection management unit 102, the network unit 103, and the LAN 111 of the remote system 4 to make the IP datagram communication possible, and makes the connection set up request of the TCP. In this second embodiment, the external access detection unit 101 on the client side is simply passed through and not operated.

Processing c-3: The request is sent to the connection management unit 102 via the network unit 103 at the target computer system (home system 2) side.

Processing c-4: The connection management unit 102 of the target computer system (home system 2) sets up the connection of the TCP to the transmission source computer system (remote system 4), and tries to activate the remote file transfer 206 of the home system 2 (server side).

Processing c-5: The external access detection unit 101 of the home system 2 detects the above connection request, and starts the processing for judging whether it is possible to set up the connection by requesting the network address and the user ID of the transmission source computer system (remote system 4) to the connection management unit 102.

Processing c-6: The connection management unit 102 of the home system 2 has obtained the network address and the connection identifier (port number) of the transmission source computer system (remote system 4) at the step of setting up the network connection, according to the protocol specification of the TCP.

Processing c-7: In addition, by inquiring to a user-connection correspondence management unit (not shown) associated with the connection management unit 102 of the transmission source computer system (remote system 4), the information such as the user ID of the transmission source computer system (remote system 4) which set up this connection is obtained, according to the identification protocol defined by the RFC1413.

Processing c-8: The connection management unit 102 of the receiving side computer system (home system 2) notifies data of the transmission source network address and user ID obtained above to the external access detection unit 101 of the request source computer system (remote system 4).

Processing c-9: The external access detection unit 101 of the receiving side computer system (home system 2) compares these data with the data in the user ID correspondence management table 105A to check whether they match with each other, and judges whether or not to connect this connection to the remote file transfer 206 (server side).

Processing c-10: When this checking is passed, the external access detection unit 101 connects the connection with the external computer system (remote system 4) to the remote file transfer 206 (server side), and put it in a state in which the actual file transfer processing can be started.

Processing c-11: When the above checking is failed, the reply indicating the rejection is returned to the transmission source computer system (remote system 4), and commands the connection management unit 102 to disconnect this connection.

Processing c-12: When the above checking is passed, the remote file transfer becomes available to the user at the remote system 4, so that the remote file transfer 206 of the remote system 4 (client side) starts the regular processing using the remote file transfer program. Namely, the log-in processing is carried out by requesting the input of the user ID at the home system 2 and the password to the user at the remote system 4, and when the log-in is successful, the actual file transfer processing is carried out.

Similarly, in a case of the remote log-in processing, the actual processing can be started after the access permission is judged by the network address and the user ID of the external computer system (remote system 4).

As described, according to this second embodiment, in the distributed environment in which a plurality of computer systems with different managements and computer system configurations are connected through a network, despite the difference in the user management and the file management at each computer system, the user can handle the personal data such as files safely at the computer system of a location to which the user has moved, so that it becomes possible to realize an efficient personal processing support even under the geographically distributed environment.

Namely, in this second embodiment, the information for specifying the computer system at a location to which the user moves such as the network address is registered into the schedule management table for each user ID in advance, before the moving, and then the remote access is made from the computer system at a location to which the user has moved after the moving, so that the remote access is possible only from the location registered in the schedule management table, and the security can be tightened. In addition, as the location to which the user moves is known in advance, it is possible to carry out the advance transfer of the files required at the location to which the user moves. Moreover, it is also possible to forward the arriving electronic mail to the location to which the user moves, so that the user's convenience in use of a computer system at the location to which the user moves can be improved considerably.

Furthermore, the judgement as to whether the user ID at the location to which the user has moved and the user ID at the location from which the user has moved indicate the same user or not is made according to the temporal password valid only during that moving rather than the password for making a log-in to the computer system, so that a possibility of the leak of the password due to the wiretapping can be reduced significantly.

In this second embodiment, the network address and the user ID are utilized in order to identify the computer system and the user, but it is equally possible to use the other identification data. For example, a system ID, a host name, a domain name, etc. can be used instead of the network address, while a user name, a combination of a user name and a domain name such as an electronic mail address, etc. can be used instead of the user ID.

It is to be noted that the second embodiment described above may be modified as follows. Namely, in the second embodiment described above, the temporary password has been entered as it is into the request data and sent to the home system at a time of carrying out the user ID correspondence establishing processing between the remote system 4 and the home system 2. However, as in a case of the first embodiment described above, it is also possible to use this temporary password as a cipher key. In such a case, instead of sending the temporary password itself from the remote system 4, the user name, the remote host name, the date and time data, etc. are encrypted by this cipher key at the remote system 4 and sent to the home system 2, while the received data are decrypted by using the temporary password corresponding to that user and checked at the home system 2.

Next, the third embodiment of a user identification data management scheme for networking computer systems according to the present invention will be described in detail.

In this third embodiment, the networking computer systems have the same overall configuration as that of FIG. 1 described above.

Figure 21:
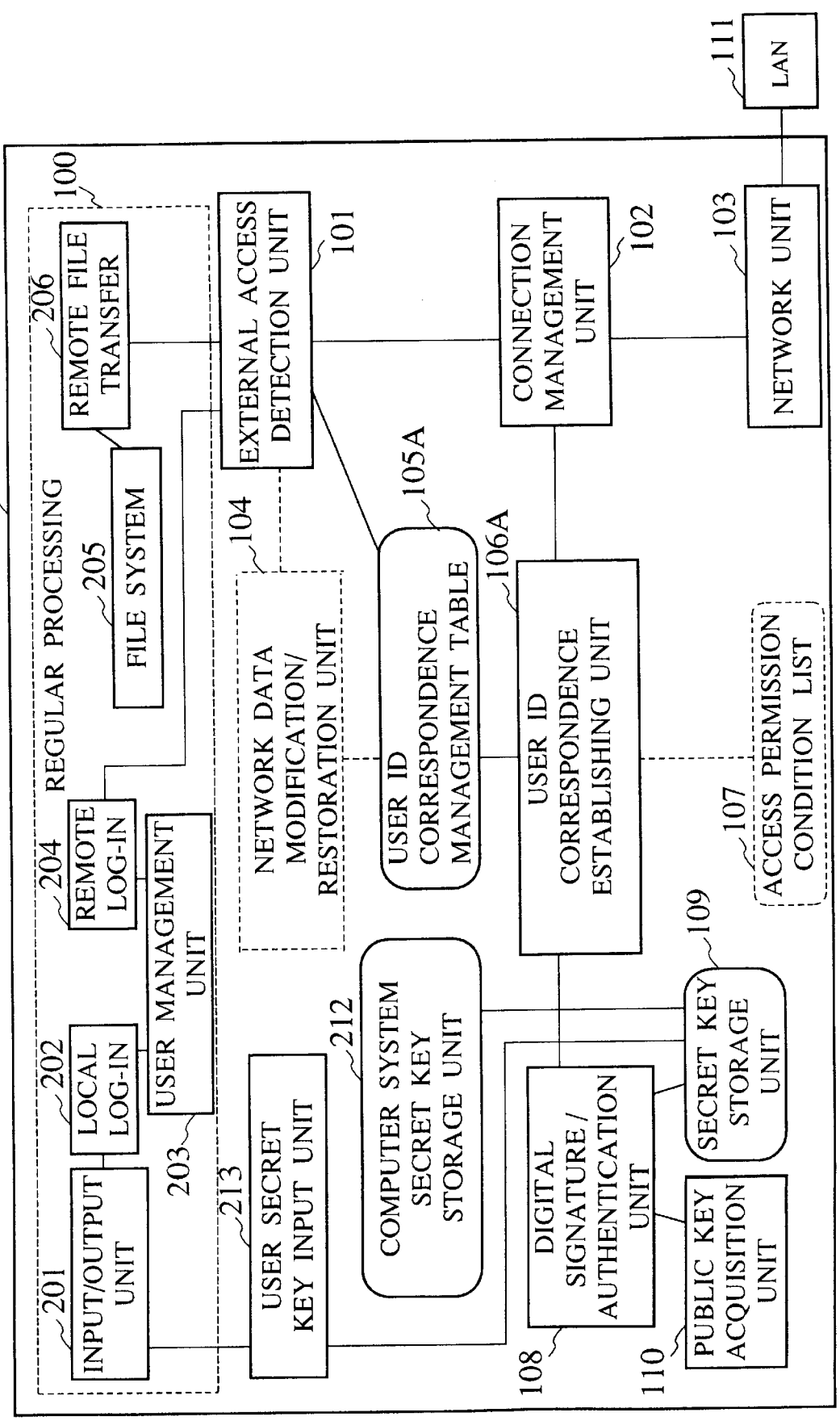
FIG. 21 is a block diagram of a functional configuration of a computer system (home system or remote system) in networking computer systems according to the third embodiment of the present invention.

Also, in this third embodiment, the home system 2 and the remote system 4 have the identical internal functional configuration 210 as shown in FIG. 21, which differs from that of FIG. 15 described above in that, the access permission condition list 107, the personal schedule management unit 151, the temporary password input 152, and the temporal password generation 153 of FIG. 15 are omitted, while the digital signature/authentication unit 108, the secret key storage unit 109, and the public key acquisition unit 110 of FIG. 2 are provided, and in addition, a computer system secret key storage unit 212 connected with the secret key storage unit 109, and a user secret key input unit 213 connected with the input/output unit 201 and the secret key storage unit 109 are further provided.

Here, the network protocol connecting the home system 2 and the remote system 4 is assumed to be the TCP/IP as in the above embodiments. Consequently, the network unit 103 carries out the IP processing, and the connection management unit 102 carries out the TCP processing. It is also assumed that the services such as TELNET and FTP are available as in the above embodiments.

Next, the operations of the above described elements will be described in detail.

Now, suppose that a certain user Ms. Tanaka has an account on the home system 2 (network address=A), and the user ID on this home system 2 is assumed to be "1". This user Ms. Tanaka also has an account on the remote system 4 (network address=B), and the user ID on this remote system 4 is assumed to be "101".

First, the authentication scheme in this third embodiment will be described. The authentication can be done for both an individual user and a computer system, and the public key cipher scheme can be used for the authentication here. Namely, an individual user or a computer system has an own unique secret key. This secret key is not public, and safely managed by the user himself herself or the computer system itself. The secret key of the computer system is safely stored in the computer system secret key storage unit 212 which is provided at a safe portion in this system, such as an inside of a kernel of the OS. The secret key of the individual user is preferably stored in an IC card or a magnetic card such that it can be hidden from the others and it can be used by the user himself whenever necessary, even at a location to which the user has moved.

The public key to be paired with the secret key is registered in the public key server, and can be freely searched and acquired at the public key acquisition unit 110 in each computer system.

Consequently, each user brings the secret key unique to the user in a safe form at a time of going out, and makes an access by using this secret key of the individual user from the external location to which the user has moved.

Thus, the user Ms. Tanaka has a secret key which is known only to herself, which is realized in this third embodiment according to the public key cipher scheme.

Now, the operation of the user Ms. Tanaka at the remote system 4 to which she has moved will be described.

In this case, the user Ms. Tanaka goes out to an external location and uses the remote system 4 provided there to do her work. Here, the user Ms. Tanaka carries out the desired processing by creating a user account on the remote system 4 or by using the user ID created and used before. In this example, the user ID of Ms. Tanaka is assumed to be "101".

Figure 22:
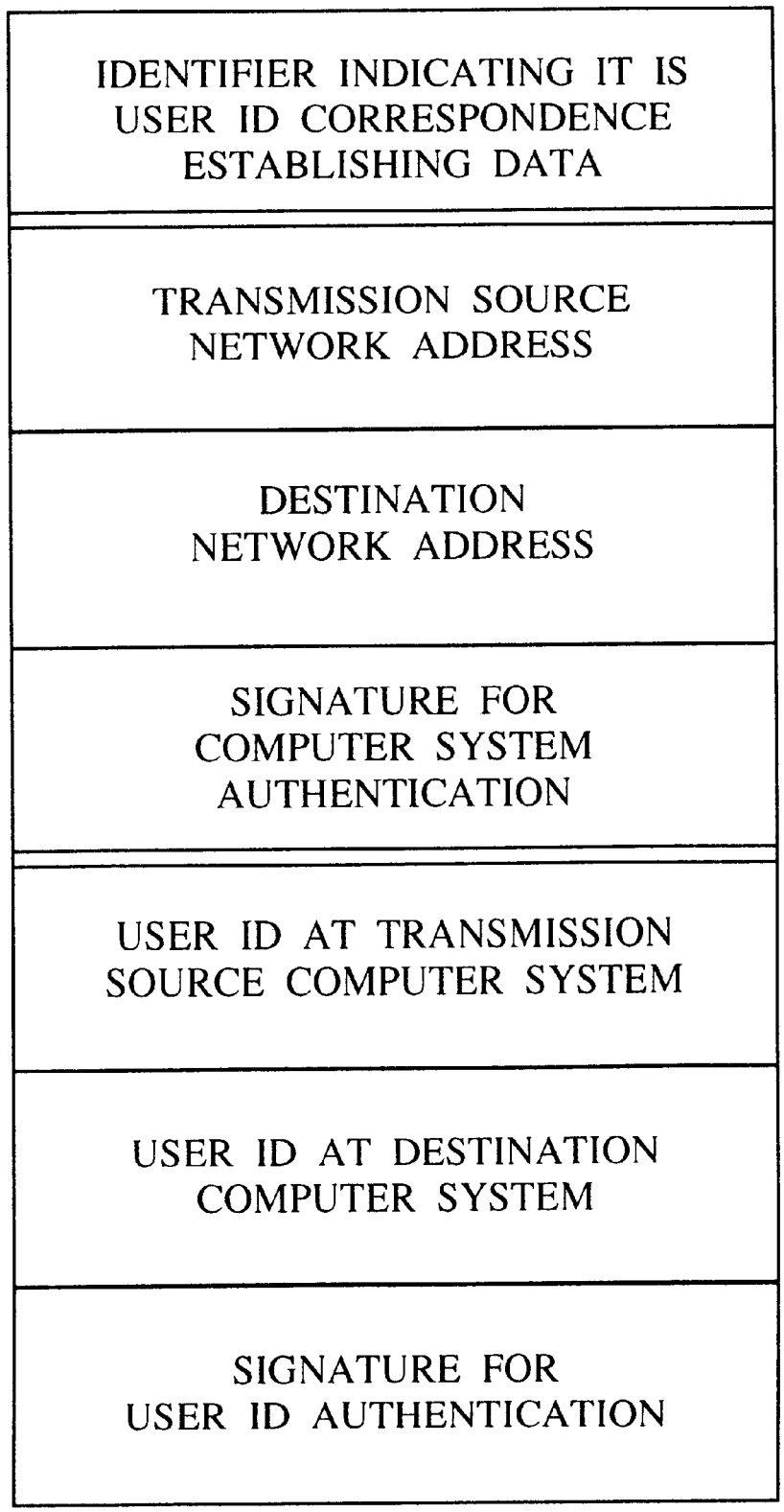
FIG. 22 is a diagrammatic illustration of a user ID uniformization request data used in the computer system of FIG. 21.

When the user Ms. Tanaka makes an access from the remote system 4 to the home system 2, upon an activation by the user Ms. Tanaka who is working at the remote system 4, the user ID correspondence establishing unit 106A of the remote system 4 produces a data for a user ID correspondence establishing request as shown in FIG. 22 for the purpose of the user ID correspondence establishing which corresponds to the session set up of the first embodiment described above, sets up a connection with the user ID correspondence establishing unit 106A of the home system 2, and carries out the user ID correspondence establishing operation.

Here, the concrete examples of the data for the user ID correspondence establishing request in this second embodiment are as follows:

(1) A transmission source network address: the network address (=B) of the remote system 4;

(2) A destination network address: the network address (=A) of the home system 2;

(3) A signature for the authentication of the computer system: the network address of the remote system 4 and the network address of the home system 2 encrypted by the secret key owned by the remote system 4 and the public key of the home system 2;

(4) A user ID at the transmission source computer system: the own user ID (="101") at the remote system 4;

(5) A user ID at the destination computer system: the own user ID (="1") at the home system 2; and (6) A signature for the authentication of the user ID: the user ID at the remote system 4 and the user ID at the home system 2 encrypted by the secret key owned by Ms. Tanaka.

Among these data for the user ID correspondence establishing request, the transmission source (system at hand, i.e., remote system 4) network address and user ID can be automatically produced, that is, the own network address is stored in the network unit 103, while the user ID is stored in the user management unit 203. The network address and user ID of the user ID correspondence establishing target (destination, i.e., home system 2) are obtained from the user.

In this third embodiment, the signature for the authentication of the computer system is produced at the digital signature/authentication unit 108. Here, the network address of the destination computer system (home system 2) and the network address of the transmission source computer system (this system itself, i.e., remote system 4) are already obtained, so that the public key of the destination computer system (home system 2) is acquired from the public key acquisition unit 110, and the secret key of this system itself (remote system 4) is obtained from the secret key storage unit 109 which stores the secret key acquired from the computer system secret key storage unit 212. Using these data, the signature for the authentication of the computer system is produced by encrypting the network address of the transmission source computer system (remote system 4) and the network address of the destination computer system (home system 2) by the secret key owned by the transmission source computer system (remote system 4) and the public key of the destination computer system (home system 2).

The signature for the authentication of the user ID is similarly produced at the digital signature/authentication unit 108. The secret key of the user is obtained from the secret key storage unit 109 into which the secret key of the user is entered from the user secret key input unit 213. Here, the network address of the destination computer system (home system 2) and the network address of the transmission source computer system (remote system 4) are already obtained, so that the signature for the authentication of the user ID is produced by encrypting these data by the secret key of the user.

Next, at the home system 2 side which received the data for the user ID correspondence establishing request from the remote system 4, the judgement and the registration for the user ID correspondence establishing are made by carrying out the following processings d-1 to d-4 at the user ID correspondence establishing unit 106A.

Processing d-1: Using the received data, the ID of the transmission source computer system (remote system 4) is authenticated.

Processing d-2: Using the received data, the user ID at the transmission source computer system (remote system 4) is authenticated.

Processing d-3: When the authentications by the processings d-1 and d-2 are successful, it is judged that the access is permitted as there is no access permission condition list in this third embodiment, and the access permission data as shown in FIG. 19 described above is registered into the user ID correspondence management table 105A, and the access permission is notified to the transmission source computer system (remote system 4).

Here, the concrete examples of access permission data registered in the user ID correspondence management table 105A are as follows:

(1) A user ID at this computer system (home system 2);

(2) A network address of a corresponding external computer system (remote system 4);

(3) A user ID at a corresponding external computer system (remote system 4); and (4) A valid period.

Processing d-4: When the authentications by the processings d-1 and d-2 are unsuccessful, data for notifying this fact is returned to the computer system (remote system 4) which is the transmission source of the user ID correspondence establishing request.

In the above operation, the authentication processing of the processing d-1 can be carried out in further detail as follows.

From the signature for the authentication of the computer system among the received data, the authentication is carried out at the digital signature/authentication unit 108 by using the secret key of the home system 2 and the public key of the remote system 4. The secret key of the home system 2 is obtained from the secret key storage unit 109 which stores the secret key acquired from the computer system secret key storage unit 212 of the home system 2. The public key of the remote system 4 is obtained from the public key acquisition unit 110, or if it is not stored there, from the external public server (now shows) via the network unit 103. Using these two keys, the signature for the authentication of the computer system is decrypted to obtain a plain text. When the obtained plain text actually coincides with the network address of the home system 2 and the network address of the remote system 4, the authentication is successful.

On the other hand, in the above operation, the authentication processing of the processing d-2 can be carried out in further detail as follows.

Similarly as in a case of the processing d-1 described above, the signature for the authentication of the user ID among the received data is decrypted by using the public key of that user to obtain a plain text. When the obtained plain text actually coincides with the user ID at the transmission source computer system and the user ID at the destination computer system which are also received at the same time, the authentication is successful. Here, the public key of the user is obtained from the public key acquisition unit 110.

The processing d-3 in the above operation is similar to the processing b-4 in the second embodiment described above. Here, however, the personal schedule management used in the second embodiment is omitted in this third embodiment, so that the valid period can be set uniformly, such as four hours from the current time, for instance.

It is also possible to produce the personal schedule management table for each user and the access permission condition list, and limit the access target and the access time for the user or the host from the external according to them, just as in the second embodiment described above.

It is also possible to realize this third embodiment by using the user name, etc. instead of the user ID.

It is also possible to modify the third embodiment described above as follows. Namely, in the third embodiment, the network address or the computer system name is used for the authentication of the computer system, but it is also possible to limit the access according to the geographical location. This can be realized by combining means for providing the geographical location data with means for storing correspondences between the geographical location and the network address or the computer system name. For example, it is possible to obtain the necessary data from a database managed by the network management system.

More specifically, the database of the network management system manages relationships among the network address, the host name (system name), and the location as shown in FIG. 23, for the purpose of the network management task such as the network trouble detection and the traffics monitoring. When this database is utilized, it is possible to limit the access in such a manner as "external access permitted from the metropolitan Tokyo area" or "only access from conference rooms in the head office permitted". This is a scheme in which the external access permission table for each user is produced instead of the personal schedule management table, and after the success of the authentication, the external access is permitted according to the content (permitted time and place) registered in this external access permission table at the user ID correspondence establishing unit 106A.

Next, the fourth embodiment of a user identification data management scheme for networking computer systems according to the present invention will be described in detail.

In contrast to the second and third embodiments described above in which the actual desired processing is started only after the user moved to the remote system 4 carries out the user ID correspondence establishing between the remote system 4 and the home system 2, this fourth embodiment concerns with a case in which the user directly carries out the actual desired processing.

In this fourth embodiment, the networking computer systems have the same overall configuration as that of FIG. 1 described above.

Figure 24:
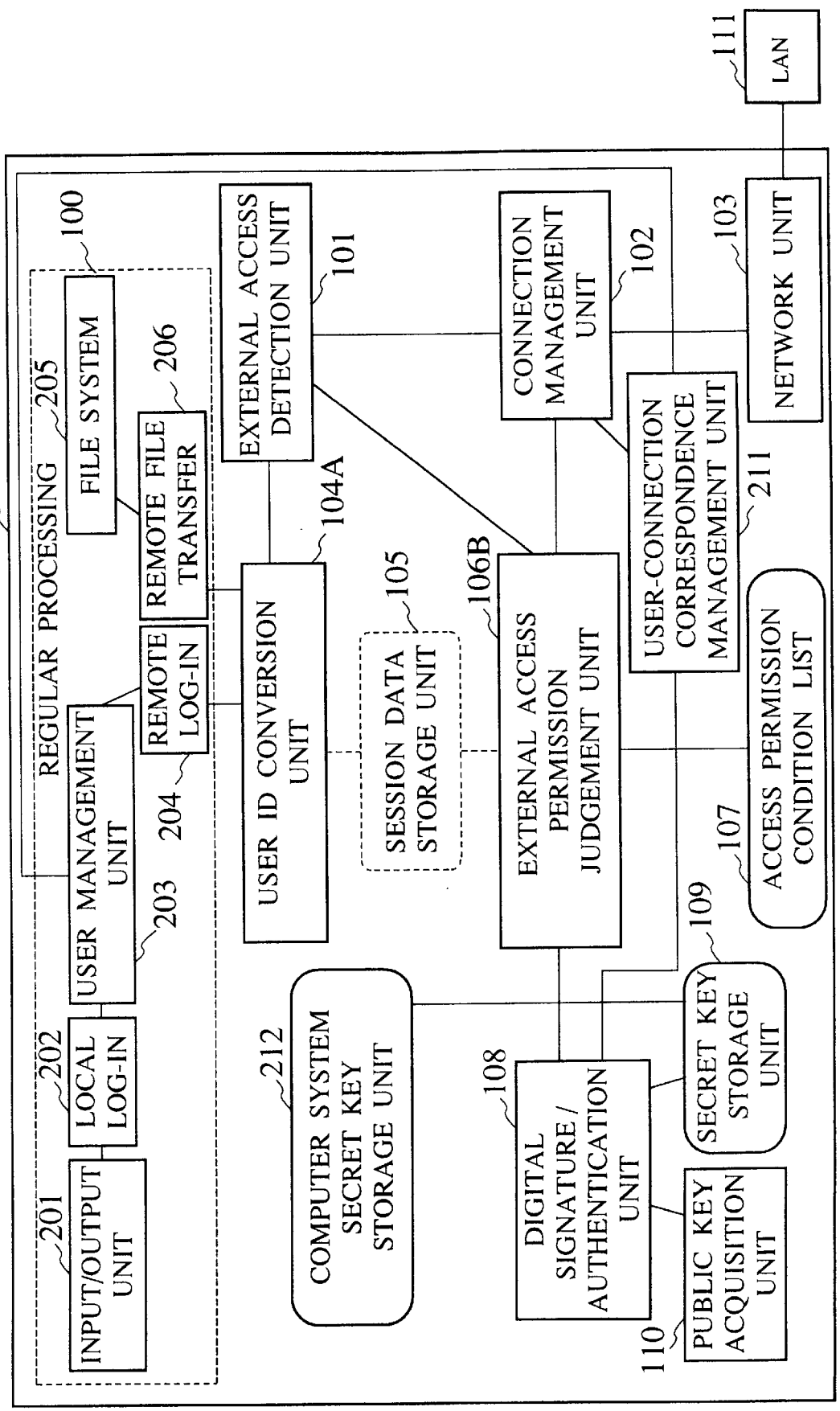
FIG. 24 is a block diagram of a functional configuration of a computer system (home system or remote system) in networking computer systems according to the fourth embodiment of the present invention.

Also, in this fourth embodiment, the home system 2 and the remote system 4 have the identical internal functional configuration 240 as shown in FIG. 24, which differs from that of FIG. 21 described above in that, the user secret key input unit 213 and the user ID correspondence management table 105A of FIG. 21 are omitted, while the access permission condition list 107 of FIG. 2 is provided, and in addition, a user ID conversion unit 104A corresponding to the network data modification/restoration unit 104 of FIG. 2, an external access permission judgement unit 106B corresponding to the session data management unit 106 of FIG. 2, and a user-connection correspondence management unit 211 connected with the user management unit 203 and the connection management unit 102 are provided, where the user ID conversion unit 104A is connected with the remote log-in 204, the remote file transfer 206, and the external access detection unit 101, and the external access permission judgement unit 106B is connected with the external access detection unit 101, the connection management unit 102, the access permission condition list 107, and the digital signature/authentication unit 108, and the user-connection correspondence management unit 211 is also connected with the digital signature/authentication unit 108.

In this configuration of FIG. 24, the remote log-in 204 and the remote file transfer 206 are modified such that they are directly activated under the right of the user ID specified from the user ID conversion unit 104A, and no user ID input processing is carried out again in each program.

Here, the network protocol connecting the home system 2 and the remote system 4 is assumed to be the TCP/IP as in the above embodiments. Consequently, the network unit 103 carries out the IP processing, and the connection management unit 102 carries out the TCP processing. It is also assumed that the services such as TELNET and FTP are available as in the above embodiments.

This fourth embodiment includes the authentication function between the computer systems similar to that of the third embodiment described above, and the authentication between the computer system is carried out before the desired processing just as in the third embodiment described above.

Next, the operations of the above described elements will be described in detail.

Now, suppose that a certain user. Ms. Tanaka has an account on the home system 2 (network address=A), and the user ID on this home system 2 is assumed to be "1". This user Ms. Tanaka also has an account on the remote system 4 (network address=B), and the user ID on this remote system 4 is assumed to be "101". The correspondence relationship between these user IDs is determined by the home system 2 and the remote system 4 and registered in the access permission condition list 107 of each computer system in advance. For example, the access permission condition list 107 of the home system 2 has data content as shown in FIG. 19 described above in this case.

Figure 25:
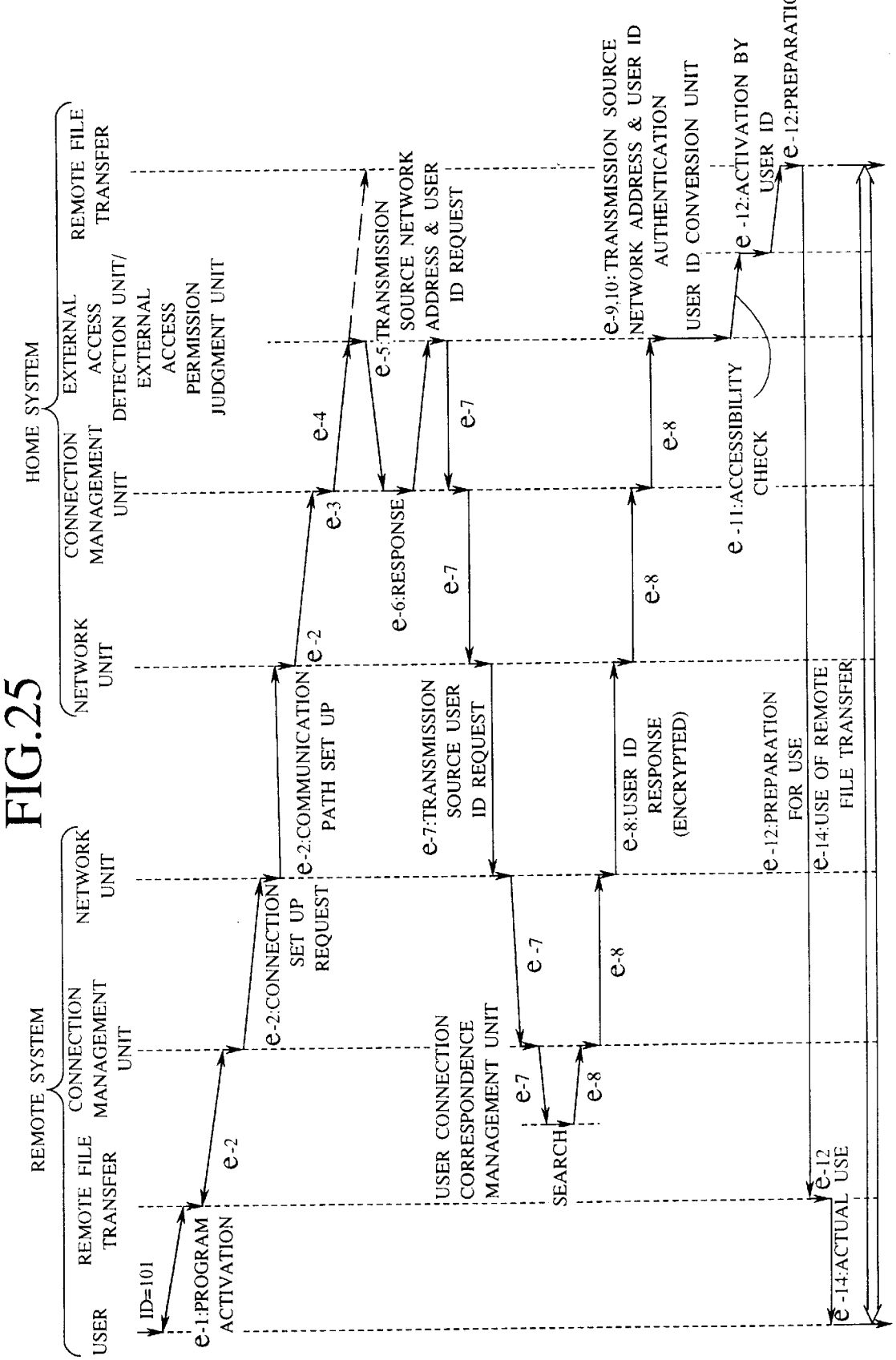
FIG. 25 is a sequence chart of a procedure for utilizing a remote file transfer from a remote system according to the fourth embodiment of the present invention.

Here, in an exemplary case in which the user Ms. Tanaka who is utilizing the remote system 4 uses the remote file transfer program in order to make a copy of a file in the home system 2, the procedure of this second embodiment is carried out according to a sequence chart of FIG. 25 by the following processings e-1 to e-14.

Processing e-1: The user Ms. Tanaka activates the remote file transfer 206 of the remote system 4 (client side) under the right of the user ID ="101".

Processing e-2: The remote file transfer program then sets up a communication path with the target computer system (home system 2) via the external access detection unit 101, the connection management unit 102, the network unit 103, and the LAN 111 of the remote system 4 to make the IP datagram communication possible, and makes the connection set up request of the TCP. In this fourth embodiment, the external access detection unit 101 on the client side is simply passed through and not operated.

Processing e-3: The request is sent to the connection management unit 102 via the network unit 103 at the target computer system (home system 2) side.

Processing e-4: The connection management unit 102 of the target computer system (home system 2) sets up the connection of the TCP to the transmission source computer system (remote system 4), and tries to activate the remote file transfer 206 of the home system 2 (server side).

Processing e-5: The external access detection unit 101 of the home system 2 detects the above connection request, and requests the external access permission judgement unit 106B to judge whether it is possible to set up the connection. In response, the external access permission judgement unit 106B requests the network address and the user ID of the transmission source computer system (remote system 4) to the connection management unit 102.

Processing e-6: The connection management unit 102 of the home system 2 has obtained the network address and the connection identifier (port number) of the transmission source computer system (remote system 4) at the step of setting up the transport layer connection, according to the protocol specification of the TCP.

Processing e-7: In addition, by inquiring to the user-connection correspondence management unit 211 of the transmission source computer system (remote system 4), the external access permission judgement unit 106B of the home system 2 obtains the information such as the user ID of the transmission source computer system (remote system 4) which set up this connection. Here the processing at the user-connection correspondence management unit 211 is carried out according to the identification protocol defined by the RFC1413.

Processing e-8: Also, at a time of responding from the user-connection correspondence management unit 211 of the remote system 4, the response data is encrypted by the secret key of this system itself (remote system 4) and a signature of the remote system 4 is attached at the digital signature/authentication unit 108 before it is returned. This response data contains the transmission source network address of the remote system 4 in plain text and the user ID encrypted by a secret key of the remote system 4.

Processing e-9: The external access detection unit 101 of the receiving side computer system (home system 2) authenticates the data with signature from the user-connection correspondence management unit 211 of the transmission source computer system (remote system 4) at the digital signature/authentication unit 108, and then obtains two data of the transmission source network address and user ID.

Processing e-10: Here, at the digital signature/authentication unit 108 of the home system 2, the above authentication is carried out by acquiring the public key of the transmission source computer system (remote system 4) at the public key acquisition unit 110, decrypting the data by the acquired public key, and authenticating the decrypted data, i.e., checking if the decrypting succeeds and the decrypted result coincide with the network address sent in plain text. When the authentication is successful, the data such as the network address and the user ID of the transmission source compter system (remote system 4) can be obtained in plain text from the response data.

Processing e-11: Whether the received data are registered in the access permission condition list 107 or not is checked. Here, if the access condition (such as that on time) is attached in addition, whether it is possible to make an access or not is checked by accounting for the access condition. The result of this checking, and the user ID at this system (home system 2) in a case the access is possible, are then notified to the external access detection unit 101.

Processing e-12: When this checking is passed, the external access detection unit 101 notifies the corresponding user ID (="1" in this example) of this system (home system 2) and the program name of a program to be activated to the user ID conversion unit 104A, and under the specified right, the remote file transfer 206 (server side) is operated to set up a connection with the remote file transfer 206 (client side) of the transmission source computer system (remote system 4), and the remote copy processing is started.

In this case, unlike the second and third embodiments described above, the authentication has already been finished, so that the access control can be carried out under the right of the authenticated user ID (=1 in this example) of this system (home system 2), without carrying out the log-in processing again. Here, however, it is also possible to carry out the log-in processing again as in the second and third embodiments described above.

Processing e-13: When the external access permission judgement unit 106B judges that it is impossible, the external access detection unit 101 returns the reply indicating the rejection to the transmission source computer system (remote system 4), and commands the connection management unit 102 to disconnect this connection.

Processing e-14: When the above checking is passed, the actual file transfer processing becomes available to the user at the remote system 4.

Similarly, in a case of the remote log-in processing, after the authentication of the network address and the user ID of the external computer system (remote system 4) is carried out, the user ID at this system corresponding to it (home system 2) is obtained, and the remote log-in processing is carried out under the right of the obtained user ID.

As described, according to this fourth embodiment, in the distributed environment in which a plurality of computer systems with different managements and computer system configurations are connected through a network, despite of the difference in the user management and the file management at each computer system, the user can handle the personal data such as files safely at the computer system of a location to which the user has moved, so that it becomes possible to realize an efficient personal processing support even under the geographically distributed environment.

Namely, in a case the user utilizes the computer system from the external conventionally, when the user ID managements are independent among the computer systems, it has been necessary to utilize the different user IDs even when the user is identical, so that this has been inconvenient. In addition, when the both computer systems are connected with the wide area network, it is difficult to trust the communication target computer system, so that the utilization from the external has required time and effort from the user to make the user confirmation by carrying out the log-in processing again.

In contrast, in this fourth embodiment, the correspondence of the user IDs is obtained and exchanged among the computer systems in advance, and the authentication function between the computer systems is added, so that at a time of the utilization by the user from the external location, by carrying out the authentication between the computer systems, the correspondence of the user IDs of the identical user can be obtained. Consequently, it becomes possible to acquire the correspondence of the user IDs and the convert the user ID automatically, without requiring the input of the user ID or the input of the password at the other machine, and therefore it is possible for the user to obtain the effect that the inconvenience such as the repeated log-in is considerably reduced, even for the computer systems with mutually different user managements.

In the above, an exemplary case of using the remote file transfer has been explained, but this fourth embodiment is also applicable to a case in which the user directly carries out a file transfer. For example, in a case of making a file access according to the protocol of the NFS (Network File System) developed by the Sun Microsystems, the authentication of the computer system is carried out among the computer systems at a time of the installation processing, to obtain the correspondence of the user IDs between these computer systems. Thereafter, by switching the user ID to the corresponding one for each packet for the file access instruction at the user ID conversion unit 104A, the access control similar to a case of use at the home system 2 can be realized even in a case of use from the remote system 4.

Also, in the above, the user ID conversion processing is carried out at the home system 2 (server) side, but it may be carried out at the remote system 4 (client) side.

Thus, according to the present invention, even when the user utilizes one computer from another computer in the distributed environment in which a plurality of computers with different managements and configurations are connected through a computer network, it is possible to utilize the resources at that one computer by using (the access right of) the user identification data at that one computer. In addition, it is possible to utilize that one computer from another computer, without requiring the user to be very conscious about the user identification data at that one computer.

Also, in a case the managements or the configurations are different, the access from the external is usually limited very strictly in order to prevent an improper access from the external location, but according to the present invention, the access from the external location is only possible between the permitted computer system and the user, so that the management of the external access becomes simpler.

Consequently, despite of the difference in the user management and the file management at each computer system, the user can make a communication and handle the personal data such as files safely at the computer system of a location to which the user has moved, so that it becomes possible to realize an efficient personal processing support even under the geographically distributed environment.

It is to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A computer system having a plurality of computers mutually connected through communication means for enabling communications among said plurality of computers, at least one computer among said plurality of computers being protected from an improper access, the system comprising:

management means for judging whether an access request to said at least one computer from another computer is to be permitted or not according to which one of said plurality of computers said another computer is, and generating access permission data to be used in checking whether a communication to said at least one computer is from one computer of said plurality of computers from which an access to said at least one computer is permitted; and memory means for storing the access permission data generated by the management means.

2. The computer system of claim 1, wherein said access request indicates a source system identification data, a destination system identification data, and a system identification signature data, and the management means judges by authenticating the system identification signature data.

3. The computer system of claim 2, wherein the system identification signature data is obtained by encrypting the source system identification data and the destination system identification data by using a secret key of said another computer, and the management means authenticates by decrypting the system identification signature data by using a public key of said another computer.

4. The computer system of claim 2, wherein the system identification signature data is obtained by encrypting the source system identification data and the destination system identification data by using a secret key of said another computer and a public key of said at least one computer, and the management means authenticates by decrypting the system identification signature data by using a public key of said another computer and a secret key of said at least one computer.

5. The computer system of claim 1, wherein when the management means judges said access request to be permitted, the management means generates the access permission data including a key data to be used in a communication from said another computer to said at least one computer.

6. The computer system of claim 5, wherein the management means also notifies the key data to said another computer by encrypting the key data.

7. The computer system of claim 1, further comprising:

detection means for detecting whether a communication to said at one computer is directly made at said at least one computer or indirectly made from said another computer through the communication means, checking whether the communication is a proper access or not according to the access permission data stored in the memory means in a case the communication is indirectly made, so as to permit the proper access.

8. The computer system of claim 7, wherein the memory means stores a set of an external user identification data of one user at said one computer, and an external system identification data of said one computer; and the detection means judges said access as proper when the memory means stores a set of the external user identification data and the external system identification data coinciding with a user identification data and a system identification data indicated by communication data of said access.

9. The computer system of claim 8, wherein the memory means also stores an internal user identification data for said one user at said at least one computer corresponding to a set of the external user identification data and the external system identification data; and said at least one computer also has conversion means for converting a user identification data indicated by communication data of said access into the internal user identification data corresponding to the external user identification data which coincides with a user identification data indicated by communication data of said access, when the detection means judges said access as proper.

10. The computer system of claim 8, wherein the memory means also stores a key data corresponding to the external user identification data and the external system identification data; and said at least one computer also has data modification means for modifying communication data of said access by using the key data corresponding to the external user identification data which coincides with a user identification data indicated by communication data of said access when the detection means judges said access as proper.

11. The computer system of claim 7, wherein the memory means also stores a key data in correspondence to the access permission data for one user at said one computer; and said at least one computer also has data modification means for modifying communication data of said access by using the key data when the detection means judges said access as proper according to the access permission data.

12. The computer system of claim 11, wherein the key data is distributed among said at least one computer and said another computer in advance, the communication data of said access from said one computer contains a message authentication code generated from the key data, and the detection means also judges whether said access is proper or not by generating a message authentication code from the key data stored in the memory means and comparing a generated message authentication code with a message authentication code contained in the communication data of said access.

13. The computer system of claim 11, wherein the key data is distributed among said at least one computer and said another computer in advance, the communication data of said access from said one computer is encrypted by the key data, and the data modification means decrypts the communication data of said access by using the key data stored in the memory means.

14. The computer system of claim 7, wherein the memory means also stores a valid period of a communication from another user at said one computer to said at least one computer; and the detection means judges said access as proper according to the valid period stored in the memory means.

15. The computer system of claim 7, wherein each of said plurality of computers is managed according to a user identification data, and when said access is indirectly made, the detection means also detects whether said another computer is a computer managed according to a user identification data by which said at least one computer is managed or a computer managed according to another user identification data different from the user identification data by which said at least one computer is managed, and judges whether said access is proper or not in a case said access is made from a computer managed according to another user identification data.

16. The computer system of claim 1, wherein the management means judges whether the access request is to be permitted or not based also on a user who makes the access request, and generates the access permission data which is also to be used in checking whether the communication is by one user who is permitted to access said at least one computer.

17. The computer system of claim 16, further comprising storage means for storing access permission conditions indicating every combination of a user and a computer which is to be permitted to make an access to said at least one computer, such that the management means judges according to the access permission conditions stored in the storage means.

18. The computer system of claim 17, wherein the access permission conditions specify a user identification data for said one user at said at least one computer, and the management means judges by comparing the access permission conditions with a user identification data of a user at said at least one computer indicated by said access request.

19. The computer system of claim 18, wherein the access permission conditions also specify a system identification data for said one computer, and the management means judges by also comparing the access permission conditions with a system identification data of said another computer indicated by said access request.

20. The computer system of claim 18, wherein the access permission conditions also specify a temporary password for said one user at said one computer, and the management means judges by also comparing the access permission conditions with a temporary password of a user at said another computer indicated by said access request.

21. The computer system of claim 20, wherein the temporary password is issued to said one user at said at least one computer in advance, and said one user sends said access request from said another computer by specifying the temporary password issued at said at least one computer.

22. The computer system of claim 18, wherein the access permission conditions also specify a valid period of a communication from said one user at said another computer to said at least one computer, and when the management judges said access request to be permitted, the management means generates the access permission data including a user identification data for said user at said at least one computer and the valid period.

23. The computer system of claim 22, wherein the valid period is determined according to a personal schedule of said one user specified by said one user at said at least one computer in advance.

24. The computer system of claim 16, further comprising storage means for storing access permission conditions indicating a user identification data for one user at said at least one computer, said access request indicates a destination user identification data and a user identification signature data, and the management means judges by authenticating the user identification signature data and comparing the destination user identification data with the user identification data indicated by the access permission conditions stored in the storage means.

25. The computer system of claim 24, wherein the user identification signature data is obtained by encrypting the destination user identification data by a secret key of said user, and the management means authenticates by decrypting the user identification signature data by using a public key of said user.

26. The computer system of claim 24, wherein said access request also indicates a source user identification data.

27. The computer system of claim 26, wherein the user identification signature data is obtained by encrypting the source user identification data and the destination user identification data by a secret key of said user, and the management means authenticates by decrypting the user identification signature data by using a public key of said user.

28. The computer system of claim 26, wherein when the management means judges said access request to be permitted, the management means generates the access permission data including a system identification data for said another computer, and a user identification data for said user at said another computer.

29. The computer system of claim 28, wherein the management means generates the access permission data which also includes a user identification data for said user at said at least one computer.

30. The computer system of claim 28, wherein the access permission conditions also specify a valid period of a communication from said one user at said another computer to said at least one computer, and the management means generates the access permission data which also includes the valid period.

31. The computer system of claim 1, further comprising:
checking means for checking whether the communication to said at least one computer is a proper access or not according to the access permission data stored in the memory means, so as to permit the proper access.

32. A computer system, comprising:
a plurality of computer groups mutually connected through a network for enabling communications among said plurality of computer groups, wherein said plurality of computer groups includes at least one computer group having:
a data management server for judging whether an access request to a computer of said at least one computer group from a computer of another computer group is to be permitted or not according to which one of said plurality of computer groups said another computer group is, and generating access permission data to be used in checking whether a communication to a computer of said at least one computer group is from a computer of one of said plurality of computer groups from which an access to the computer of said at least one computer group is permitted; and
a security gateway including:
a memory for storing a key data in correspondence to the access permission data generated by the data management server; and
a unit communicatively connected to the memory, the unit checking whether a communication to a computer of said at least one computer group is a proper access or not according to the access permission data, so as to permit the proper access while modifying communication data of the proper access by using the key data.

33. The computer system of claim 32, wherein the security gateway is divided into a filtering router having functions of said checking and the memory, and a data processing server having functions of the memory and said modifying.

34. The computer system of claim 32, wherein the data management server judges whether the access request is to be permitted or not based also on a user who makes the access request, and generates the access permission data which is also to be used in checking whether the communication is by one user who is permitted to access said at least one computer.

35. A computer in a computer system formed by a plurality of computers mutually connected through a network for enabling communications among said plurality of computers, said computer comprising:

a management unit for judging whether an access request to said computer from another computer is to be permitted or not according to which one of said plurality of computers said another computer is, and generating access permission data to be used in checking whether a communication to said computer is from one of said plurality of computers from which an access to said computer is permitted; and a memory communicatively connected to the management unit, the memory storing the access permission data generated by the management unit.

36. The computer of claim 35, further comprising:

a checking unit communicatively connected to the memory, the checking unit for checking whether the communication to said computer is a proper access or not according to the access permission data stored in the memory so as to permit the proper access.

37. A computer system, comprising:

a plurality of computers mutually connected through communication means for enabling communications among said plurality of computers, wherein said plurality of computers include at least one computer having:

detection means for detecting whether an access to said at least one computer is directly made at said at least one computer or indirectly made from another computer through the communication means, judging whether said access is proper or not in a case said access is indirectly made, and permitting said access in a case said access is judged as proper;

memory means for storing a set of an external user identification data of one user at one computer from which an access to said at least one computer by said one user is to be permitted, an external system identification data of said one computer, and an internal user identification data for said one user at said at least one computer, such that the detection means judges said access as proper when the memory means stores a set of the external user identification data and the external system identification data coinciding with a user identification data and a system identification data indicated by communication data of said access; and conversion means for converting a user identification data indicated by communication data of said access into the internal user identification data corresponding to the external user identification data which coincides with a user identification data indicated by communication data of said access, when the detection means judges said access as proper.

38. A computer system, comprising:

a plurality of computers mutually connected through communication means for enabling communications among said plurality of computers, wherein said plurality of computers include at least one computer having:

storage means for storing access permission conditions indicating a set of an external user identification data of one user at one computer from which an access to said at least one computer by said one user is to be permitted, an external system identification data of said one computer, and an internal user identification data for said one user at said at least one computer;

detection means for detecting whether an access to said at least one computer is directly made at said at least one computer or indirectly made from another computer through the communication means;

management means for judging whether said access from a user at said another computer to said at least one computer is to be permitted or not in a case said access is indirectly made, and permitting said access in a case said access is judged to be permitted, the management means judges by authenticating a source system identification data of said another computer, obtaining a source user identification data encrypted by a secret key of said another computer, authenticating the source user identification data by decrypting the source user identification data by using a public key of said another computer, and checking the access permission conditions stored in the storage means for authenticated source user identification data and source system identification data; and conversion means for converting a user identification data indicated by communication data of said access into the internal user identification data corresponding to the external user identification data which coincides with a user identification data indicated by communication data of said access, when the detection means judges said access as proper.

39. A method of managing a computer system formed by a plurality of computers which are mutually connected through a network, the method comprising the steps of:

judging whether an access request to one computer from another computer is to be permitted or not according to which one of said plurality of computers said another computer is;

generating access permission data to be used in checking whether a communication to said one computer is from a computer from which an access to said one computer is permitted; and storing the access permission data in a memory.

40. The method of claim 39, wherein the judging step judges whether the access request is to be permitted or not based also on a user who makes the access request, and the generating step generates the access permission data which is also to be used in checking whether the communication is by one user who is permitted to access said at least one computer.

41. The method of claim 39, further comprising the step of:

checking whether the communication to said one computer is a proper access or not according to the access permission data stored in the memory, so as to permit the proper access.

42. The method of claim 41, wherein the storing step stores the access permission data including a key data, and the checking step modifies the communication data of the proper access by using the key data stored in the memory.

43. The method of claim 39, further comprising the steps of:

detecting whether a communication to said one computer is directly made at said one computer or indirectly made from another computer through the network; and checking whether the communication to said one computer is a proper access or not according to the access permission data stored in the memory in a case the communication is indirectly made, so as to permit the proper access.

44. A method of establishing a data communications session between a user at a first computer and a second computer, the second computer being a part of a local area network, the first computer not being a part of the local area network but being capable of connecting with the local area network via a wide area network, the user having a first ID code for accessing the first computer, and the user having a second ID code for accessing the second computer when the user is accessing the second computer within the local area network, the method comprising the steps of:

a) sending a command from the user to the first computer to set up the data communications session with the second computer;

b) transmitting, from the first computer, a request to the second computer to set up the data communications session with the second computer, the request having associated data including: i) a transmission source network address of the first computer used to access the first computer via the wide area network, ii) the first ID code of the user, iii) a destination network address of the second computer used to access the second computer via the wide area network, iv) the second ID code of the user, v) a unique signature code of the first computer, and vi) a unique signature code of the second computer, the unique signature code of the first computer being encrypted by a public key of the first computer that is also known to the second computer, the unique signature code of the second computer being encrypted by a secret key of the user known only to the user and the second computer;

c) receiving the request at the second computer, and authenticating the request by the following substeps:

c1) determining whether the request is being made by the user at the first computer, the determination being made by the second computer from the associated data included in the request;

c2) determining whether the request has been received within a period of time that the user is allowed to access the second computer from the first computer, the period of time being stored as access permission data in a memory at the second computer;

c3) if the request has been received within the allowed period of time as determined in the step c2), transmitting, from the second computer to the first computer, a session allowable message which includes a session ID for allowing the data communications session and transmitting the session ID to the user at the first computer, the session allowable message including: i) a temporary cipher key for use by the user at the first computer for accessing the second computer only during the data communications session using the session ID, ii) the unique signature code of the first computer, and iii) the unique signature code of the second computer; and c4) checking, by the first computer, to determine whether the session allowable message is a valid message sent from the second computer, the checking being made by determining if the unique signature code of the first computer and the unique signature code of the second computer as contained in the session allowable message are valid, the unique signature code of the first computer being decrypted at the first computer by using the public key of the first computer, the unique signature code of the second computer being decrypted at the first computer by using the secret key of the user.

45. A method of managing a computer system formed by a plurality of computers which are mutually connected through a network, comprising the steps of:

judging whether an access request for a communication to one computer from a user at another computer is to be permitted or not according to which one of said plurality of computers said another computer is;

generating access permission data to be used in checking whether each communication to said one computer corresponds to the access request judged to be permitted;

storing the access permission data including a key data stored in a memory; and checking whether the communication to said one computer is a proper access or not according to the access permission data stored in the memory, so as to permit the proper access while modifying communication data of the proper access by using the key data stored in the memory.

* * * * *